United States Patent
Viswanathan Iyer et al.

(10) Patent No.: US 11,349,893 B1
(45) Date of Patent: May 31, 2022

(54) SYSTEM AND METHOD FOR NORMALIZING SHARED CONTENT DURING A VIDEO CONFERENCE SESSIONS

(71) Applicant: Dell Products, LP, Round Rock, TX (US)

(72) Inventors: Vivek Viswanathan Iyer, Austin, TX (US); Daniel L. Hamlin, Round Rock, TX (US)

(73) Assignee: Dell Products, LP, Round Rock, TX (US)

(*) Notice: Subject to any disclaimer, the term of this patent is extended or adjusted under 35 U.S.C. 154(b) by 0 days.

(21) Appl. No.: 17/187,450

(22) Filed: Feb. 26, 2021

(51) Int. Cl.
| | |
|---|---|
| *H04L 65/613* | (2022.01) |
| *H04L 65/401* | (2022.01) |
| *H04N 7/14* | (2006.01) |
| *G06F 3/14* | (2006.01) |
| *H04L 65/403* | (2022.01) |

(52) U.S. Cl.
CPC ........ *H04L 65/4092* (2013.01); *G06F 3/1415* (2013.01); *H04L 65/403* (2013.01); *H04L 65/4015* (2013.01); *H04N 7/148* (2013.01)

(58) Field of Classification Search
CPC ............. H04L 65/4092; H04L 65/4015; H04L 65/403; G06F 3/1415; H04N 7/148
See application file for complete search history.

(56) References Cited

U.S. PATENT DOCUMENTS

| | | |
|---|---|---|
| 8,471,890 B1 | 6/2013 | Golas |
| 8,477,173 B2 | 7/2013 | Kenoyer |
| 9,549,152 B1 | 1/2017 | Nayyar |
| 9,781,385 B2 | 10/2017 | Ma |
| 10,045,089 B2 | 8/2018 | Jeong |
| 10,187,433 B2 | 1/2019 | Maistri |

(Continued)

FOREIGN PATENT DOCUMENTS

| | | | | |
|---|---|---|---|---|
| CN | 104603807 A | * | 5/2015 | ........... G06Q 10/101 |
| CN | 113395478 A | * | 9/2021 | ........... H04L 65/605 |

(Continued)

*Primary Examiner* — Oanh Duong
(74) *Attorney, Agent, or Firm* — ProI Intellectual Property Law, PLLC; H. Kenneth ProI

(57) ABSTRACT

A host server information handling system executing a multimedia multi-user collaboration application (MMCA) ma include a processor; a memory; a power management unit; a network interface device to receive and transmit audio/visual (AV) data during execution of the MMCA for a video conference session; the processor configured to execute a screen resolution normalization system to: initiate an out-of-band (OOB) communication with each participating endpoint device and requests data descriptive of a resolution of an presenting display at each participating endpoint device; receive the data descriptive of the resolution of the presenting displays at each participating endpoint device to every other participating endpoint device; and determine an autoscaling factor descriptive of how to upscale and downscale video frames of the AV data received at each of the participating endpoint devices based on the data descriptive of the resolution of the presenting displays; transmit the autoscaling factor based on the resolution of the presenting displays at each participating endpoint device to each participating endpoint device.

20 Claims, 6 Drawing Sheets

(56) References Cited

U.S. PATENT DOCUMENTS

| | | | |
|---|---|---|---|
| 10,671,337 B2 * | 6/2020 | Khalatian | G06F 16/954 |
| 11,004,422 B1 * | 5/2021 | Bull | G09G 5/006 |
| 2010/0188476 A1 | 7/2010 | Thapa | |
| 2014/0125755 A1 | 5/2014 | Thomas | |
| 2014/0267570 A1 | 9/2014 | Weber | |
| 2016/0021149 A1 | 1/2016 | Maistri | |

FOREIGN PATENT DOCUMENTS

| | | | |
|---|---|---|---|
| CN | 113468120 A * | 10/2021 | |
| WO | WO-2010091370 A2 * | 8/2010 | G06F 17/30893 |

* cited by examiner

US 11,349,893 B1

SYSTEM AND METHOD FOR NORMALIZING SHARED CONTENT DURING A VIDEO CONFERENCE SESSIONS

FIELD OF THE DISCLOSURE

The present disclosure generally relates to multi-user collaboration applications such as video conference applications. More specifically, the present disclosure relates to normalizing shared content during the video conference session executed by the multi-user collaboration application.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
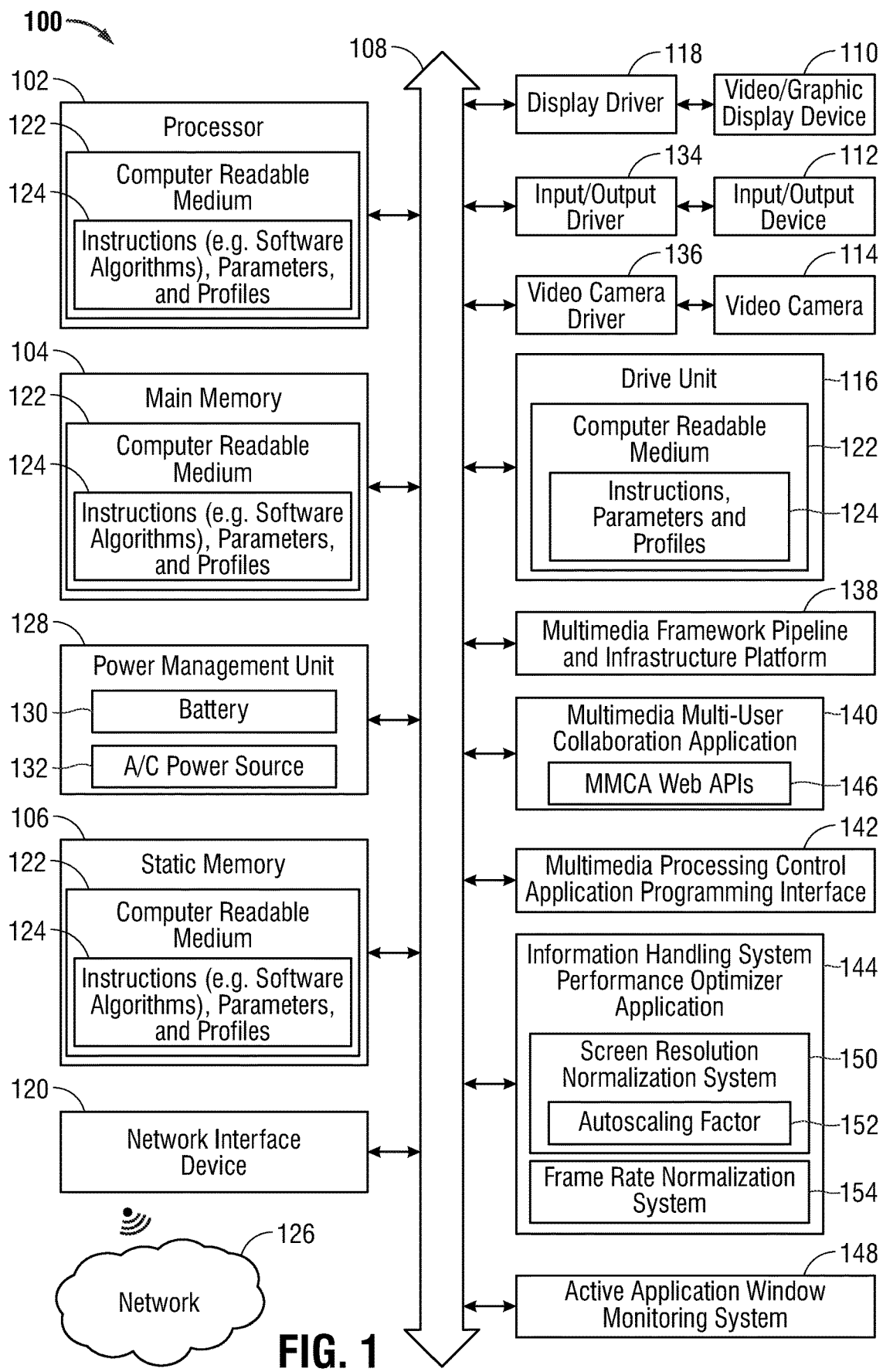
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As working remotely has gained in popularity, so too has the prevalence of multi-employee or multi-business video conferences. Many of these video conferences (also referred to as web-conferences, online meetings, tele-video conferences, or remote conferences) may include a large number of people, sometimes exceeding 50 or 100 participants. In many cases, only one or a handful of meeting participants are actively engaged in the meeting, as presenters, or as active participants in a discussion, for example. During these video conferences, users share, at least, audio/visual (AV) data with each of the other so that each user may see and hear each of the participants. These users may also, when asked, share other data such as documents, presentations (e.g., PowerPoint® presentations), pictures, and audio. However, during the video conference session, an image resolution of each user's display devices may not be similar. Additionally, the operating frames rates of each user's display device may also not be similar. The dissimilarities in resolutions and frame rates may lead to visual distortions in the AV data perceived at each user's display device. For example, a user may receive AV data at the user's information handling system from a host information handling system that includes a display device with a relatively higher resolution and frame rate than the display device of the user's information handling system. In order to view this AV data (e.g., the video frames), the user's information handling system, according to the embodiments described herein, applies an autoscaling factor to that AV data to downscale (or upscale) this AV data.

In an embodiment, a host server information handling system executing a multimedia multi-user collaboration application (MMCA) may be used to coordinate the transmission of the autoscaling factors (e.g., downscaling factors/upscaling factors) among each of the information handling systems engaged in the video conference session. In the present specification these other information handling systems may be referred to as endpoint devices that are operated by a user; each user engaged in the video conference session. In this embodiment, the host server information handling system may execute, via a processor, a screen resolution normalization system to initiate an out-of-band (OOB) communication with each participating endpoint device and requests data descriptive of a resolution of a presenting display at each participating endpoint device. This allows the host server information handling system to receive the data descriptive of the resolution of the presenting displays at each participating endpoint device relative to every other participating endpoint device in order to determine an autoscaling factor descriptive of how to upscale and downscale video frames of the AV data received at each of the participating endpoint devices. This autoscaling factor may be based on the data descriptive of the resolution of the presenting displays as received at a central management system or host server from OOB communications with other participating devices in an embodiment. The autoscaling factor, once determined by the host server information handling system, may be transmitted to each participating endpoint device in order to direct how each of the endpoint devices may upscale or downscale the AV data, such as shared screen content received from each of those participating endpoint devices in order to view the AV data without any visual artefacts in the frames seen. Thus, for example, shared content will not appear small on a recipient's screen, but instead normalized in terms of size and resolution at a recipient device.

In an embodiment, each of the information handling systems (e.g., each endpoint device) may use the autoscaling factor to upscale or downscale AV data received or transmitted to other information handling systems. In an embodiment, this autoscaling factor may be applied automatically by a first information handling system to AV data sent from the first information handling system. In other embodiments, an autoscaling factor may be applied automatically to AV data received at a second information handling system by the second information handling system to adjust resolution or size of screen or shared content. This process may reduce any visual artefacts in the AV data during the video conference session. Still further, the execution of the information handling system performance optimizer application 144, the screen resolution normalization system 150, and frame rate normalization system 154 as described herein, the participants in the video conference session may each view the video conference session at a resolution and frame rate that matches the performance characteristics of their respective display devices. This centralized coordination among participants' systems in a video conference session may reduce occurrence of visual artefacts in AV data such as disparities in screen size appearance of screenshare content, blockiness or blurring of screenshare content, and AV data transmission delays during transfer and upscaling or downscaling of the AV data such as shared screen content.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, a host server hosting a video conference session by execution of a MMCA, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

The information handling system 100 described with reference to FIG. 1 may represent a transmitting (e.g., AV media data source) information handling system or a receiving (e.g., AV media data sink) information handling system in various embodiments. In still other embodiments, information handling system 100 may operate as both a transmitting and a receiving information handling system, as may be the case for an information handling system transmitting video of one participant user while simultaneously executing code instructions for the MMCA 140 to display videos of other participants within a shared user video conference session or relay those videos between the participants. In yet another embodiment, the information handling system 100 may operate remotely from all transmitting or receiving information handling systems while executing code instructions of the MMCA 140 to coordinate participation within a user session such as a MMCA control provider server information handling system. Additionally, some or all of the MMCA 140 described herein may operate on a server, blade, rack, or cloud-based network maintained and controlled by the manufacturer of several information handling systems, or managed by an employer or enterprise owner of several information handling systems. In another embodiment, the information handling system 100 may operate an information handling system performance optimizer application 144 within one of these servers, blades, racks, or across various nodes of a cloud-based network to monitor certain performance metrics at each of the plurality of such information handling systems, perform firmware and software updates, confirm security credentials and compliance, coordinate autoscaling of resolutions and frame rates among the plurality of such information handling systems, and manage user access across the plurality of information handling systems (e.g., as owned by an employer or enterprise corporation). In some embodiments, each of the plurality of transmitting and receiving information handling systems participating within a user video conference session of the MMCA 140 may incorporate an agent or API for the information handling system performance optimizer application 144 when it is executed on a remote information handling system.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as the processor 102, a central processing unit (CPU), a graphics processing unit (GPU), hardware or software control logic, or any combination thereof. Additional components of the information handling system 100 can include one or more storage devices, one or more communications ports for communicating with external devices, as well as, various input/output (I/O) devices 112, such as a keyboard, a mouse, a video/graphic display 110, or any combination thereof. In an embodiment, the I/O devices 112 may each include an associated input/output driver 134 to be executed by the processor 102 in order to enable an operating system of the information handling system 100 and other computer programs to access hardware functions of the I/O devices 112. The information handling system 100 may further include a display driver 118 to enable an operating system of the information handling system 100 and other computer programs to access one or more video/graphics display devices 110. The information handling system 100 can also include one or more buses 108 operable to transmit communications between the various hardware components. Portions of an information handling system 100 may themselves be considered information handling systems 100 in an embodiment.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), graphical processing unit (GPU), vision processing unit (VPU), gaussian neural accelerator (GNA) control logic or some combination of the same. Any of the processing resources may operate to execute code that is either firmware or software code. Moreover, the information handling system 100 can include memory such as main memory 104, static memory 106, computer readable medium 122, and drive unit 116 (volatile (e.g. random-access memory, etc.), nonvolatile (read-only memory, flash memory etc.) or any combination thereof) storing instructions 124 in computer readable medium 122. Such code instructions 124 may be software, firmware, or combinations thereof that execute the multimedia framework pipeline and infrastructure platform 138 (MFPIP), MMCA 140, multimedia processing control application programming interface 142 (MPCAPI), information handling system performance optimizer application 144, screen resolution normalization system 150, frame rate normalization system 154, or active application window monitoring system 148 in various embodiments. The information handling system 100 can also include one or more buses 108 operable to transmit communications between the various hardware components such as any combination of various input and output (I/O) devices.

The information handling system 100 may further include one or more video displays 110 with varying possible resolutions and frame rate operation. The video display 110 in an embodiment may function as a liquid crystal display (LCD), an organic light emitting diode (OLED), a flat panel display, or a solid-state display. Additionally, the information handling system 100 may include an I/O devices 112 used to interact with the graphics presented at the video/graphic display device 110, such as a cursor control device (e.g., mouse, touchpad, or gesture or touch screen input), and a keyboard. Video/graphic display device or devices 110 may be used to present AV data screenshare content during a video conference session in an example embodiment. Also, I/O devices 112 include cameras, microphones, and speakers to capture or play back AV data of a video conference session via the MMCA 140.

The network interface device 120 can provide connectivity to a network 126, e.g., a wide area network (WAN), a local area network (LAN), wireless local area network (WLAN), a wireless personal area network (WPAN), a wireless wide area network (WWAN), or other networks. Connectivity may be via wired or wireless connection. The network interface device 120 may operate in accordance with any wired or wireless data communication standards. To communicate with a wireless local area network, standards including IEEE 802.11 WLAN standards, IEEE 802.15 WPAN standards, or a WWAN via standards such as 3GPP or 3GPP2, or similar wireless standards may be used. In some aspects of the present disclosure, one network interface device 120 may operate two or more wireless links.

The network interface device 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well as the NRFR1, NRFR2, bands, and other known bands. In an embodiment, the network interface device 120 with a wireless adapter may transceive within radio frequencies associated with the 5G New Radio (NR) Frequency Range 1 (FR1) or Frequency Range 2 (FR2), or those associated with 4G LTE and other standards predating the 5G communications standards now emerging. NRFR1 may include radio frequencies below 6 GHz. NRFR2 may include radio frequencies above 6 GHz, made available within the now emerging 5G communications standard. Communications within the WLAN or WWAN may be enabled through the use of either an evolved Node B (eNodeB) executing an evolved packet core of an existing LTE system, or a Next Generation Node B (gNodeB) executing the next generation packet core of the 5G cellular standard.

In some embodiments, software, firmware, dedicated hardware implementations such as application specific integrated circuits (ASICs), programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system or some combination thereof. For example, the information handling system performance optimizer application 144 may be code sets with instructions 124 for performing various processing tasks to provide an autoscaling factor 152 via execution of a screen resolution normalization system 150 as well as to provide frame rate normalization across the plurality of information handling systems via execution of a frame rate normalization system 154. Further, in an exemplary, non-limited embodiment, implementations can include distributed processing, component/object distributed processing, and parallel processing. Alternatively, distributed computer system processing can be constructed to implement one or more of the methods or functionalities as described herein.

The present disclosure contemplates a computer-readable medium that includes instructions 124, parameters, and profiles or receives and executes instructions 124, parameters, and profiles responsive to a propagated signal, so that a device connected to a network 126 can communicate voice, video or data over the network 126. Further, the instructions 124 may be transmitted or received over the network 126 via the network interface device 120 or a wireless adapter, for example.

The information handling system 100 can include a set of instructions 124 that can be executed to cause the computer system to perform any one or more of the methods or computer-based functions disclosed herein. For example, instructions 124 may execute an information handling system performance optimizer application 144 with the screen resolution normalization system 150 and frame rate normalization system 154, a MPCAPI 142, a MMCA 140, a MFPIP 138, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116, main memory 104, and static memory 106, may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the information handling system performance optimizer application 144 with the screen resolution normalization system 150 and frame rate normalization system 154, MPCAPI 142, MMCA 140, MFPIP 138, software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the information handling system performance optimizer application 144 with the screen resolution normalization system 150 and frame rate normalization system 154, MPCAPI 142, MMCA 140, MFPIP 138, may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The information handing system performance optimizer application 144 with the screen resolution normalization system 150 and frame rate normalization system 154, MPCAPI 142, MMCA 140, and/or MFPIP 138, may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 128 (a.k.a. a power supply unit (PSU)). The PMU 128 may manage the power provided to the components of the information handling system 100 such as the processor 102, a cooling system, one or more drive units 116, a graphical processing unit (GPU), the video/graphic display device 110, and other components that may require power when a power button has been actuated by a user. In an embodiment, the PMU 128 may be electrically coupled to the bus 108 to provide this power. The PMU 128 may regulate power from a power source such as a battery 130 or A/C power adapter 132. In an embodiment, the battery 130 may be charged via the A/C power adapter 132 and provide power the to the components of the information handling system 100 when A/C power from the A/C power adapter 132 is removed.

In an embodiment, during execution of the MMCA 140 to engage two or more participants in a video conference session, the video frames received at the MFPIP 138 from a video camera 114 may be used, in real-time to present streaming video to other client devices operatively coupled to the information handling system 100. A host participant may be among the participants who has coordinated the invitations to attend the video conference session. Still further, a participant (e.g., the host or any other participant) may be, at any given time, a presenter. This presenter may share screenshare content with other participants in order to provide additional subject matter to be presented during the video conference session. This screenshare content may include documents (e.g., Word® documents), presentations (e.g., PowerPoint® presentations), spreadsheets, pictures, and audio or other software application screenshare content used to facilitate the discussion during the video conference session. As mentioned herein, the sharing of this screenshare content by a presenter having one or more video/graphic display devices 110 that have a resolution relatively higher than other participants' video/graphic display devices 110 in an example embodiment results in the screenshare content appearing small on the recipients' display devices. Other screenshare content issues or artefacts may include blockiness or blurring of screenshare content or AV data transmission delays during transfer and upscaling or downscaling of the AV data. During this time, in the embodiments described herein, the MFPIP 138 may be directed by the information handling system performance optimizer application 144 to apply an autoscaling factor 152 to each video frame sent and shared content therein and received from the information handling system as well as apply an adjustment to a frame rate by the operation of the frame rate normalization system 154. The autoscaling factor 152 may be any upscaling or downscaling factor that adjusts the screenshare content either at the transmitting information handling system 100 prior to transmission to a specific participant information handling system or at the participating information handling system prior to display on one or more video/graphic display devices 110. Still further, in an embodiment, the MFPIP 138 may also make any adjustments to each video frame such as encoding, color corrections, virtual background overlaying, among other visual adjustments before sending that data out to the other network-connected information handling systems.

As described, the information handling system 100 may further include an MMCA 140. The MMCA 140 may be any application that, when executed by the processor 102, initiate a video conference session between a plurality of users such as between the user of the information handling system 100 and another remote user of another information handling system. MMCA 140 may utilize an MMCA central facility server, such as the information handling system 100 in an embodiment, to engage in the video conference. With the MFPIP 138 and MPCAPI 142 and per the operations of the information handling system performance optimizer application 144 described herein, the MMCA 140 may cause video frames to be transmitted to the MFPIP 138 for processing, reprocessing, encoding, decoding, capture, and display (e.g., via bus 108) and present each video frame to the user at the video/graphic display device 110. The video frames may include the screenshare content (or other content sharing) described herein as well as any other AV data such as video and audio from a presenter. In some embodiments, a participant may implement multiple video/graphic display devices 110 to view both the screenshare content as well as the video and audio captured at the presenter's information handling system. Examples of a MMCA 140 may include Zoom® developed by Zoom Video Communications®, Skype® developed by Skype Technologies of Microsoft®, Microsoft Teams® by Microsoft®, WebEx® developed by Cisco®, GoToMeeting® developed by LogMeIn®, among others.

The MMCA 140 may include any number of MMCA web APIs 146 that defines how the MMCA 140 interacts with the MPCAPI 142, the MFPIP 138, and the information handling system performance optimizer application 144. In an embodiment, the information handling system performance optimizer application 144 may interface with the operation of the MMCA 140 via the MMCA web APIs 146 in order to transmit AV data from and receive data at the MMCA 140 as described herein. The autoscaling factor 152 may be defined by a particular downscaling or upscaling process that either reduces the number of pixels of the received or sent video frame or increases the number of pixels of the received or sent video frames. The autoscaling factor 152 may be set for each information handling system engaged in the video conference session based on a resolution of a display associated with the other information handling systems engaged in the video conference session. In an embodiment, the autoscaling factor 152 may be set for a specific video/graphic display device 110 of each participants' information handling system designated or detected as being the video/graphic display device 110 used to receive the screenshare content thereon. The recipients' video/graphic display device 110 used to receive the screenshare content may change from one video/graphic display device to another and the autoscaling factor 152 may similarly be adjusted accordingly during the video conference session as necessary.

The information handling system 100 may also include a MFPIP 138. The MFPIP 138 may be any video processing system of the information handling system 100 that, with the processor 102, executes AV detection processing instruction modules to detect, for example, blur, color vector, and compression artefacts within each of the video frames created as the video camera (e.g., webcam) as well as correct for any of these and any other visual errors within any given video frame. As described herein, the MFPIP 138 may be directed by the information handling system performance optimizer application 144 to apply an autoscaling factor 152 to every video frame received at the MMCA 140 and every video frame sent from the MMCA 140 in order to prevent non-scaled or small video output at each information handling system engaged in the video conference session. The autoscaling factor 152 is based on the disparate resolutions of the display devices among the plurality of information handling systems engaged in the video conference session.

In an embodiment, the information handling system 100 includes MPCAPI 142. The MPCAPI 142 in an embodiment may operate to facilitate communication between various applications, controllers, and drivers of the information handling system 100 in an embodiment. For example, the MPCAPI 142 may interface between the MFPIP 138 and the information handling system performance optimizer application 144. The MPCAPI 142 may, during operation of the information handling system 100, receive the individual video frames and direct the processor to execute the AV detection processing instruction modules to be executed. In an embodiment, the MPCAPI 142 may conduct an offloading process where the MPCAPI 142 has received, for example, processing instructions directing the offloading of processing from the processor 102 to another processing device such as a VPU, GPU, GNA, among others. For example, instead of using the processing resources associated with the processor 102, the MPCAPI 142 may, per the processing instructions, direct a graphical processing unit (GPU), vision processing unit (VPU), gaussian neural accelerator (GNA) control logic or some combination of the same to supply additional processing resources to, for example, increase the encoding/decoding rate of the image frames. This may allow for the processor 102 to engage in other processes during the video conference session executed by the MMCA 140 such as file sharing and chatting among other processes.

In an embodiment, the MFPIP 138, MMCA 140, MPCAPI 142, and information handing system performance optimizer application 144 with the screen resolution normalization system 150 and frame rate normalization system 154 may communicate with the main memory 104, the processor 102, the video/graphic display device 110, a keyboard, and the network interface device 120 via bus 108, and several forms of communication may be used, including ACPI, SMBus, a 24 MHZ BFSK-coded transmission channel, or shared memory. Driver software, firmware, controllers and the like may communicate with applications on the information handling system 100.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

During operation of the information handling system 100, the MMCA 140 may be executed or, alternatively, the information handling system 100 may act as the MMCA host server used to relay AV data among the client information handling systems described herein. During operation of the information handling system 100, the processor may execute an information handling system performance optimizer application 144. The information handling system performance optimizer application 144 may perform various processes used to initiate an out-of-band (OOB) communication with each participating endpoint device and request data descriptive of a resolution of a presenting display at each participating endpoint device. The information handling system performance optimizer application 144 may also receive the data descriptive of the resolution of the presenting displays at each participating endpoint device to every other participating endpoint device. As described herein, the resolution of the presenting displays may determine the autoscale factor used to upscale or downscale the screenshare content from a presenting information handling system. In an embodiment, the information handling system 100 of FIG. 1 may be the presenting information handling system. In another embodiment, any other information handling system (e.g., any endpoint device) engaged in the video conference session may be the presenting information handling system in addition to or alternatively to the information handling system 100 of FIG. 1. In order to facilitate the exchange or execution of the correct autoscale factor, the information handling system 100 may include an active application window monitoring system 148. The active application window monitoring system 148 may facilitate the exchange of an autoscale factor by detecting the resolution of the video/graphic display devices 110 used by the presenter to screenshare content during the video conference session. By detecting the specific resolution of the video/graphic display devices 110 used by the presenter to screenshare content during the video conference session, the active application window monitoring system 148 may pass this information onto the information handing system performance optimizer application 144 and screen resolution normalization system 150 in order to determine and use or receive and use the proper autoscaling factor to achieve the best visual results as any given video/graphic display device 110 used by any participant on the video conference session to view the screenshare content. It is understood in the present specification that the frame rate may also be detected by the information handing system performance optimizer application 144 executing the frame rate normalization system 154 and the autoscaling factor may also be determined based upon the detected frame rate of any given video/graphic display devices 110 including the frame rate of a presenting video/graphic display devices 110 of a presenting information handling system.

With this resolution data from each participant and from the presenting information handling system (e.g., 100), the information handling system performance optimizer application 144 may then determine an autoscaling factor descriptive of how to upscale and downscale video frames of the AV data received at each of the participating endpoint devices based on the data descriptive of the resolution of the presenting displays. In the context of a host server information handling system 100, the information handling system 100 may then transmit the autoscaling factor based on the resolution of the presenting displays at each participating endpoint device to each participating endpoint device. These processes initiated by the information handling system performance optimizer application 144 may be completed, automatically, at each individual information handling system engaged in the video conference session, by the host server information handling system 100 described, or by a host information handling system 100 responsible for leading the video conference session during execution of the MMCA 140. In the present specification and in the appended claims, the term "video conference session" is meant to be understood as the entire duration of the execution of the MMCA 140 that provides AV signals to be transmitted and received by a plurality of participants of the video conference session. Additionally, in the present specification and in the appended claims, the term "participant" is meant to be understood as any person who, via an information handling system, participates in a video conferencing session.

In an embodiment, the information handling system performance optimizer application 144 may also determine an autoscaling factor descriptive of how to upscale and downscale video frames of the AV data sent from each of the participating endpoint device. This autoscaling factor used for sent AV data may also be based on the data descriptive of the resolution of the presenting displays associated with the display devices of each participating information handling system. Therefore, in an embodiment, an autoscaling factor may be created to upscale or downscale video frames for data both sent from any given information handling system or received by any of the information handling systems engaged in the video conference session. As described herein, these autoscaling factors 152 may be sent to the other participating information handling systems via an OOB communication channel. Because the resolution and frame rates of the individual display devices do not necessarily change during the video conference session, these autoscaling factors 152 can be sent once and applied to each video frame as described herein. This coordination among participants' systems in a video conference session may reduce occurrence of visual artefacts in AV data such as disparities in screen size appearance of screenshare content, blockiness or blurring of screenshare content, and AV data transmission delays during transfer and upscaling or downscaling of the AV data. By automatically pre-determining the resolutions and frame rates of the respective video/graphic display devices 110 and generating the autoscaling factors, the systems and methods described herein may improve the speed at which the AV data is displayed (e.g., screenshare content) thereby reducing the lag in any screenshare content being displayed or switching to screenshare content.

In an embodiment, the information handling system performance optimizer application 144 may also execute a frame rate normalization system 154. Similar to the execution of the screen resolution normalization system 150, the execute of the frame rate normalization system 154 may cause the information handling system performance optimizer application 144 to request frame rate data from each of the participating information handling systems during the video conference session and cause data to be sent to each of the participating information handling systems in order to adjust for disparate frames rates among the participating endpoint devices. The execution of this process may eliminate any choppiness in video streaming that is discernable by any user of the participating information handling systems. By automatically pre-determining the frame rates of the respective video/graphic display devices 110, the systems and methods described herein may improve the speed at which the AV data is displayed (e.g., screenshare content) thereby reducing the lag in any screenshare content being displayed. In an embodiment, the adjustment of a frame rate may cause each display to operate at a lowest frame rate among the participating information handling systems.

In an embodiment, the information handling system 100 may include an active application window monitoring system 148. The active application window monitoring system 148 may be executed by the processor of the information handling system to detect which among a plurality of display devices a presenter of the video conferencing session is presenting a document or other application content (e.g., any screenshare content described herein) from and requesting data descriptive of a resolution of that display device used to present the document. It is often the case that a participating information handling system may be using multiple display devices such as on a laptop with one or more externally connected display devices. The resolution and frame rate among these different display devices at any given participating information handling system may vary. As such, the active application window monitoring system 148 may detect from which display device AV data including document sharing and presentations. At any given time or as the participant switches from one display device to another at their respective information handling systems, such as to screenshare content or switch content shared from different applications the active application window monitoring system 148 may signal to the information handling system performance optimizer application 144 that a frame rate or a resolution has or has not changed and indicate or resend any autoscaling factors 152 and frame rate data accordingly.

In an embodiment, the information handling system performance optimizer application 144 may determine the autoscaling factor 152 as it relates to a window that an active application being shared in by a presenter. In this embodiment, therefore, the information handling system performance optimizer application 144 does not autoscale or determine an autoscaling factor 152 to be applied to those video frames of the entire display but instead only the video frames of the GUI of those applications sent to the recipients. For example, where a presenter is presenting a PowerPoint® presentation, the information handling system performance optimizer application 144 may cause the AV data associated with only the video frames of the GUIs created by the execution of the PowerPoint® presentation to be subjected to the autoscaling factor 152 prior to transmission of those video frames of the GUI. This may allow a presenter to select specific application GUIs to be presented to the other participants of the video conference session. To accomplish this, instead of the MMCA 140 providing an option to the presenter to share an entire screen (e.g., one of the video/graphic display devices 110), an option may be presented by the MMCA 140 to the presenter to select an option to specify which executing application GUIs to share with the participating information handling systems.

Figure 2:
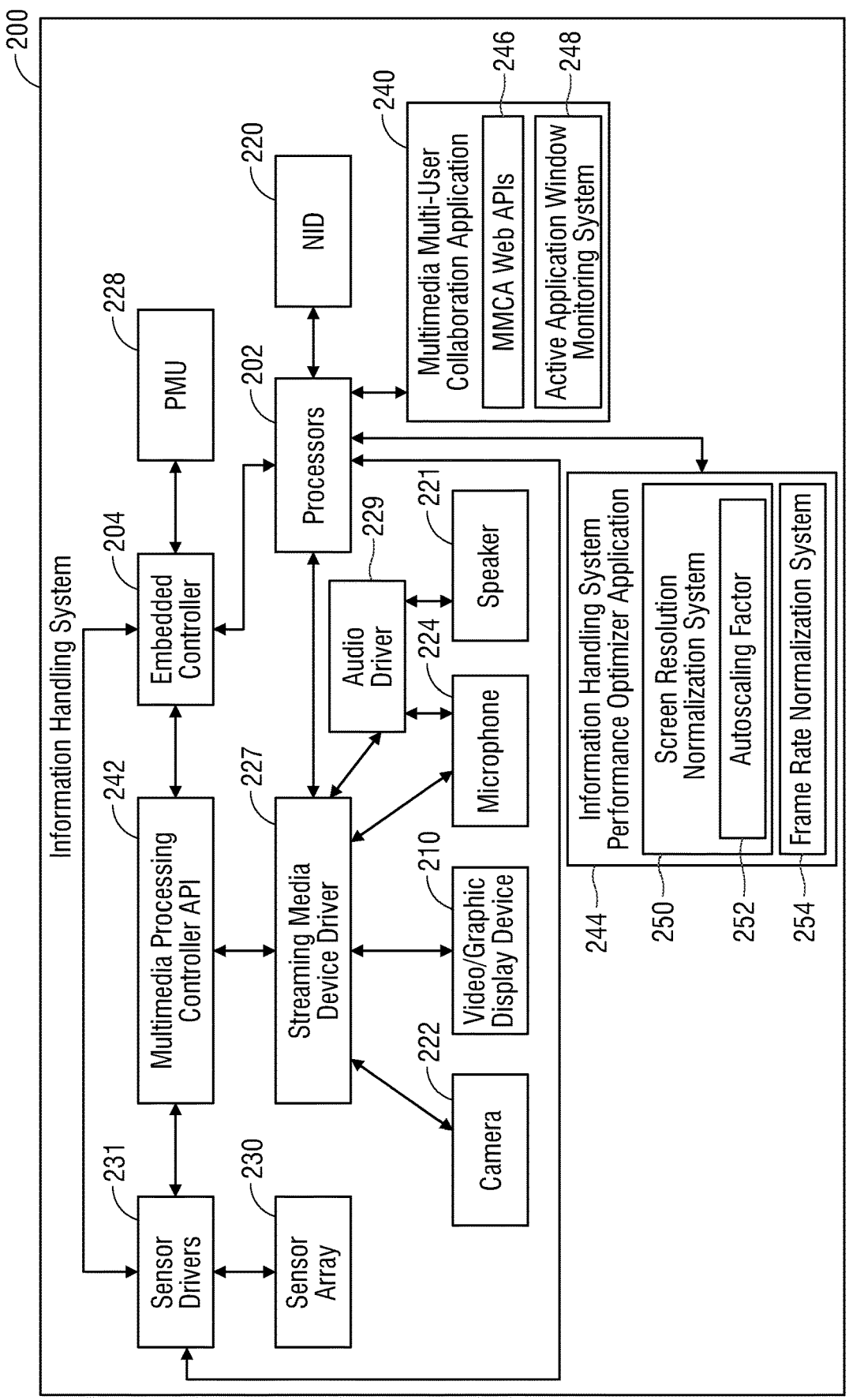
FIG. 2 is a block diagram illustrating various drivers and processors in communication with a plurality of peripheral devices of an information handling system according to an embodiment of the present disclosure.

FIG. 2 is a block diagram illustrating various drivers and processors in communication with a plurality of peripheral devices of an information handling system according to an embodiment of the present disclosure. FIG. 2 shows the operative couplings of a number of devices and processes present and executed within the information handling system 200 during operation of the information handling system 200. During operation, the information handling system 200 may be powered on via use of an on switch on the PMU 228. The PMU 228 may power on an embedded controller 204 that, in an embodiment, executes a basic input/output system (BIOS). The BIOS may also, in an embodiment, execute an operating system (OS).

In an embodiment, the information handling system 200 includes a network interface device 220 that provides connectivity to a network, e.g., a wide area network (WAN), a local area network (LAN), wireless local area network (WLAN), a wireless personal area network (WPAN), a wireless wide area network (WWAN), or other networks. Again, the connectivity may be via wired or wireless connection.

As described herein, the information handling system 200 may include an MMCA 240. The MMCA 240 may be any application that, when executed by the processor 202, initiates and conducts a video conference session between a plurality of users such as between the user of the information handling system 200 and another remote user of another information handling system. MMCA 240 may utilize an MMCA central facility server, such as the information handling system 200 in an embodiment, to engage in the video conference. With a multimedia framework pipeline and infrastructure platform MFPIP and a multimedia processing control application programming interface (MPCAPI) and per the operations of the information handling system performance optimizer application 244 described herein, the MMCA 240 may cause video frames to be transmitted to the MFPIP for processing, reprocessing, encoding, decoding, capture, and display (e.g., via bus 108, FIG. 1) and present each video frame to the user at the video/graphic display device 210.

The MMCA 240 may include any number of MMCA web APIs 246 that define how the MMCA 240 interacts with the MPCAPI 242, the MFPIP, and the information handling system performance optimizer application 244. The MMCA web APIs 246 may interface with the information handling system performance optimizer application 244 during operation of the information handling system 200 and screen resolution normalization system 250 in order to provide one or more autoscaling factors 252 to one or more participating information handling systems 200 during a video conference session. The MMCA web APIs 246 may also interface with a frame rate normalization system 254 to coordinate a frame rate among the participating information handling systems 200 during the video conference session so that one or more of these information handling systems 200 may adjust a frame rate of a display device 210.

The operation of the information handling system 200 according to FIG. 2 may include the execution of the MMCA 240 to initiate the video conference session as described herein. The information handling system 200 may then execute the information handling system performance optimizer application 244 to engage the screen resolution normalization system 250 to initiate an OOB communication with each participating endpoint device and requests data descriptive of a resolution of a presenting display or plural displays 210 at each participating endpoint device. This OOB communication may be via any communication link that is different from the communication link used by the information handling system 200 to send the video frames and other AV data to the information handling systems engaged in the video conferencing session.

The requested data descriptive of a resolution of a presenting display or displays 210 at each participating endpoint devices (e.g., the other information handling systems engaged in the video conference session) include a resolution of a display device 210 each of the users of the endpoint devices are using to engage with during the video conference session. For example, the screen resolution normalization system 250 may interface with an active application window monitoring system 248 that describes which, among a potential plurality of display devices 210, the participant of any given endpoint device is using to engage with during the video conference session. As such, each endpoint device may further include this active application window monitoring system 248 in order to provide, at any time, data descriptive of which display device 210, among a plurality of display devices 210 a presenter may be implementing to engage in the video conference session and to share screenshare content of an application window displayed there. In a particular embodiment, if and when a user of any given endpoint device changes display devices 210 used to engage with in the video conference session (e.g., by dragging a MMCA 240 window from one display device 210 to another using a mouse device), the active application window monitoring system 248 may send a signal to the screen resolution normalization system 250 or any screen resolution normalization system 250 within the network (e.g., via the OOB communication link) indicating such as change. As described herein, the presenter may share screenshare content with other participants in order to provide additional subject matter to be presented during the video conference session. This screenshare content may include documents (e.g., Word® documents), presentations (e.g., PowerPoint® presentations), spreadsheets, pictures, or other active software application content used to facilitate the discussion during the video conference session. The sharing of this screenshare content by a presenter having one or more video/graphic display devices 210 that have a resolution relatively higher than other participants' video/graphic display devices 210 may result in the screenshare content appearing small on the recipients' display devices 210 in an example embodiment. Other issues may include blockiness or blurring of screenshare content or AV data transmission delays during transfer and upscaling or downscaling of the AV data. Thus, among the resolution data shared, the presenter's resolution may be shared in order to better determine a proper autoscaling factor used to upscale or downscale the AV data presented by the presenter so that these artefacts may not be seen at the other respective display devices of the endpoint devices.

In an embodiment, the information handling system performance optimizer application 244 may determine the autoscaling factor 252 as it relates to a window that an active application being shared in by a presenter. In this embodiment, therefore, the information handling system performance optimizer application 244 does not autoscale or determine an autoscaling factor 252 to be applied to those video frames of the entire display but instead only the video frames of the GUI of those applications sent to the recipients. For example, where a presenter is presenting a PowerPoint® presentation, the information handling system performance optimizer application 244 may cause the AV data associated with only the video frames of the GUIs created by the execution of the PowerPoint® presentation to be subjected to the autoscaling factor 252 prior to transmission of those video frames of the GUI. This may allow a presenter to select specific application GUIs to be presented to the other participants of the video conference session. To accomplish this, instead of the MMCA 240 providing an option to the presenter to share an entire screen (e.g., one of the video/graphic display devices 210), an option may be presented by the MMCA 240 to the presenter to select an option to specify which executing application GUIs to share with the participating information handling systems.

The screen resolution normalization system 250 may also cause a frame rate normalization system 254 to be executed by the processor 202 or embedded controller 204 or some combination in order to also detect, via the OOB communication link, the respective frame rates of a presenting display device 210 of each of the endpoint devices engaged in the video conference session. The frame rate may be used by the information handling system performance optimizer application 244 to determine which frame rates to suggest to each endpoint device be used in order to adjust the frame rates appropriately in order to reduce any choppiness in the video streaming of the video frames at the endpoint devices.

The information handling system 200 described in connection with FIG. 2 may be similar to any endpoint device (e.g., any information handling system) engaged and participating in the video conference session. As such, the information handling system 200 may include any sensors or sensor arrays 230 used to provide additional data to the information handling system 200 that may facilitate the operation of the information handling system 200. A sensor driver 231 may be provided to allow the sensor array 230 to interface with the processor 202 of the information handling system 200. The information handling system 200 may also include a video camera 222 and a microphone 224 in order to provide video data (e.g., video frames) and audio data during the execution of the MMCA 240 and the video conference session. An audio driver 229 may be used to interface the microphone 224 with the processor 202 in order to provide a software interface to the hardware devices of the microphone 224, enabling operating systems and other computer programs to access hardware functions. It is contemplated that the information handling system 200 may include one or more speakers 221. The streaming media driver 227 may also gather audio samples recorded at the microphone 224 and provide audio output from the speakers 221.

The information handling system 200 may further include a MPCAPI 242. The MPCAPI 242 in an embodiment may operate to facilitate communication between various applications, controllers, and drivers of the information handling system 200 in an embodiment. For example, the MPCAPI 242 may interface between the MFPIP and the information handling system performance optimizer application 244. The MPCAPI 242 may, during operation of the information handling system 200, receive the individual video frames and direct the processor to execute the AV detection processing instruction modules to be executed such as the autoscaling factors described herein. The autoscaling factor 252 may be any upscaling or downscaling factor that adjusts the screenshare content either at the transmitting information handling system 200 prior to transmission to a specific participant information handling system or at the participating information handling system prior to display on one or more video/graphic display devices 210. Still further, in an embodiment, the MFPIP may also make any adjustments to each video frame such as encoding, color corrections, virtual background overlaying, among other visual adjustments before sending that data out to the other network-connected information handling systems.

As described herein, the resolution of the presenting displays may determine the autoscale factor used to upscale or downscale the screenshare content from a presenting information handling system. In an embodiment, the information handling system 200 of FIG. 2 may be the presenting information handling system. In another embodiment, any other information handling system (e.g., any endpoint device) engaged in the video conference session may be the presenting information handling system in addition to or alternatively to the information handling system 200 of FIG. 2. In order to facilitate the exchange or execution of the correct autoscale factor, the information handling system 200 may include an active application window monitoring system 248. The active application window monitoring system 248 may facilitate the exchange of an autoscale factor by detecting the resolution of the video/graphic display devices 210 used by the presenter to screenshare content during the video conference session using the information handling system 200. By detecting the specific resolution of the video/graphic display devices 210 used by the presenter to screenshare content during the video conference session, the active application window monitoring system 248 may pass this information onto the information handling system performance optimizer application 244 and screen resolution normalization system 250 in order to determine and use or receive and use the proper autoscaling factor to achieve the best visual results as any given video/graphic display device 210 used by any participant on the video conference session to view the screenshare content. It is understood in the present specification that the frame rate may also be detected by the information handing system performance optimizer application 244 executing the frame rate normalization system 254 and the autoscaling factor may also be determined based upon the detected frame rate of any given video/graphic display devices 210 including the frame rate of a presenting video/graphic display devices 210 of a presenting information handling system.

Figure 3:
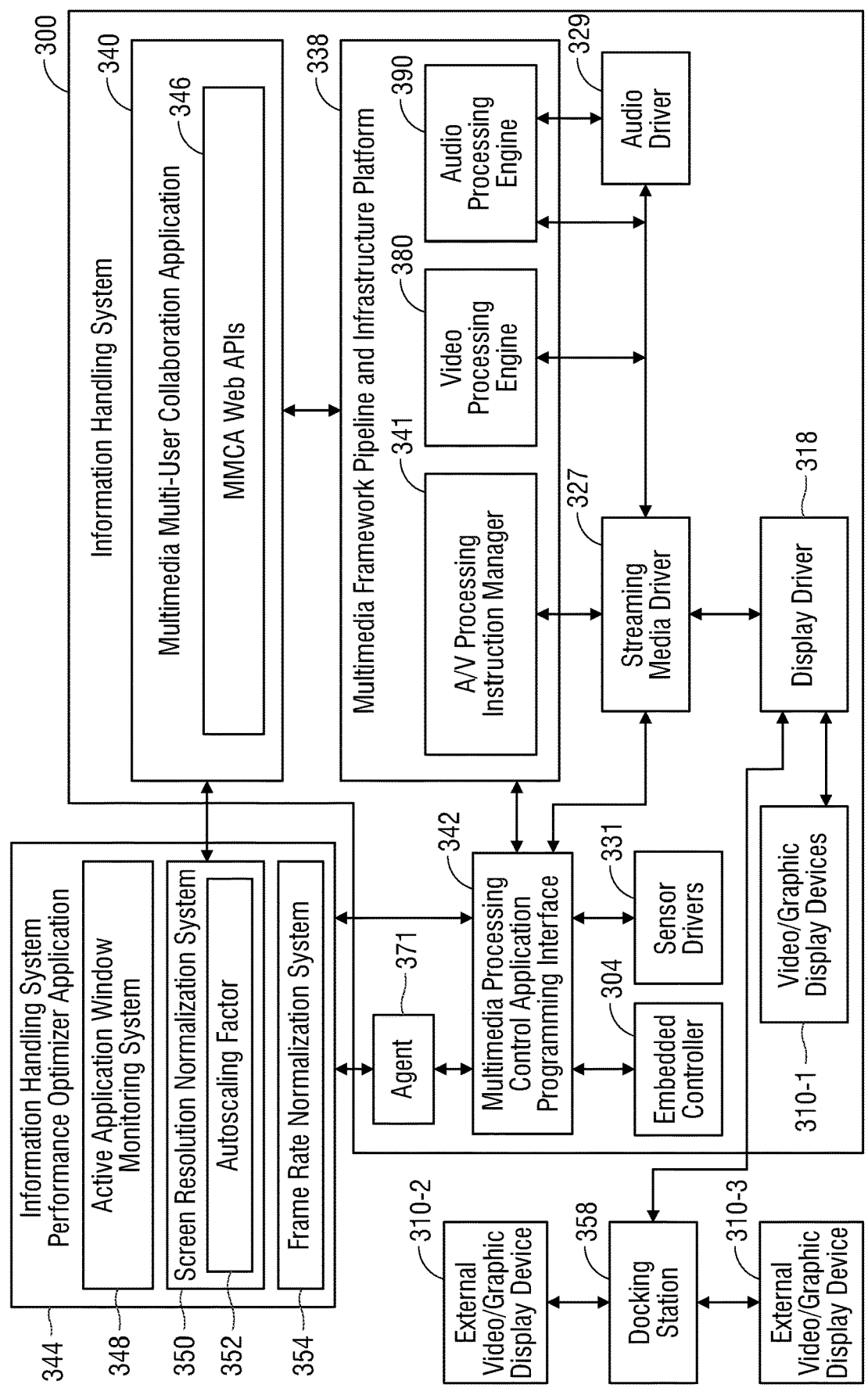
FIG. 3 is a block diagram illustrating a multimedia framework pipeline and infrastructure platform of an information handling system and an operatively-coupled information handling system performance optimizer application according to an embodiment of the present disclosure.

FIG. 3 is a block diagram illustrating an information handling system 300 according to another embodiment of the present disclosure. FIG. 3 shows the interactions between the different hardware, software, and firmware components of the information handling system 300 relative to an information handling system performance optimizer application 344. The information handling system performance optimizer application 344 may perform various processes used to initiate an OOB communication with each participating endpoint device and requests data descriptive of a resolution of a presenting display at each participating endpoint device. Among this data descriptive of a resolution of a presenting display at each participating endpoint device, data descriptive of a presenting information handling system may be used to define an autoscaling factor to be used so that other endpoint devices may view the screenshare content from the presenter without the inclusion of the artefacts described herein.

In an embodiment, the information handling system 300 may include any sensors or sensor arrays used to provide data to the information handling system 300 that may facilitate the operation of the information handling system 300. One or more sensor drivers 331 may be provided to allow the sensors to interface with a processor such as the embedded controller 304 of the information handling system 300. The information handling system 300 may also include a video camera and a microphone as input sensors in order to provide video data (e.g., video frames) and audio data during the execution of the MMCA 340 and the multimedia framework pipeline and infrastructure platform (MFPIP) 338 during the video conference session.

The information handling system performance optimizer application 344 may, upon receiving the data descriptive of the resolution of the presenting displays at each participating endpoint device and determine an autoscaling factor 352 descriptive of how to upscale and downscale video frames of the AV data received at each of the participating endpoint devices based on the data descriptive of the resolution of the presenting displays. The execution of the information handling system performance optimizer application 344 may also cause the autoscaling factor 352 to be transmitted to each participating endpoint device. The autoscaling factors 352 is based on the resolution of the presenting displays at each participating endpoint device. In the embodiment shown in FIG. 3, the information handling system performance optimizer application 344 may be remote and central to a plurality of information handling systems 300 and may operate to coordinate the delivery of the autoscaling factors 352 amongst the endpoint devices participating in the video conference session as described herein. In an alternative embodiment, the information handling systems 300 may be the presenting information handling system 300 that presents that screenshare content with other endpoint devices participating in the video conference session. In this embodiment, the information handling systems 300 may provide, via the OOB communication, a resolution of a presenting display device used by the presenter to present the screenshare content so that other devices may receive and apply the correct autoscaling factor such as via an agent 371 operating at a presenter information handling system or participant information handling system.

The autoscaling factor 352 may be determined or formed based on any disparities in resolutions between any given endpoint devices such as the information handling system 300 descried herein. In an embodiment, the information handling system performance optimizer application 344 may determine the autoscaling factor 352 by dividing the resolution of the presenting display of a first information handling system (e.g., a presenter or host of the video conference session) by the resolution of the presenting display of the participant (e.g., any given endpoint device). In an embodiment, the information handling system performance optimizer application 344 may determine the autoscaling factor 352 as it relates to a window that an active application being shared in by a presenter. In this embodiment, therefore, the information handling system performance optimizer application 344 does not autoscale or determine an autoscaling factor 352 to be applied to those video frames of the entire display but instead only the video frames of the GUI of those applications sent to the recipients. For example, where a presenter is presenting a PowerPoint® presentation, the information handling system performance optimizer application 344 may cause the AV data associated with only the video frames of the GUIs created by the execution of the PowerPoint® presentation to be subjected to the autoscaling factor 352 prior to transmission of those video frames of the GUI. This may allow a presenter to select specific application GUIs to be presented to the other participants of the video conference session. To accomplish this, instead of the MMCA 340 providing an option to the presenter to share an entire screen (e.g., one of the video/graphic display devices 310-1, 310-2, 310-3), an option may be presented by the MMCA 340 to the presenter to select an option to specify which executing application GUIs to share with the participating information handling systems.

In these embodiments, the autoscaling factors 352 relayed across the network of endpoint devices by the information handling system performance optimizer application 344 may be different for each endpoint device. In an embodiment, the autoscaling factors 352 may be used by a multimedia framework pipeline and infrastructure platform (MFPIP) 338 of any information handling system 300 for post-processing of the video frames received at the endpoint device of the individual participants. Alternatively, or additionally, the autoscaling factor 352 may be used by any MFPIP 338 at any information handling system 300 (e.g., a presenting information handling system) to pre-process any video frames to be sent out from the information handling systems 300. Thus, in an embodiment, each information handling system 300 may receive an autoscaling factor 352 to pre-process video frames being sent to other information handling systems 300 and post-process video frames received by each information handling system 300. By pre-processing and post-processing the video frames, the autoscaling factors 352 may eliminate any blockiness that may result in executing a single autoscaling factor 352 to video frames that have been either received or sent.

In an embodiment, the information handling system performance optimizer application 344 may be an application executed remote from the information handling system 300 such that the data received from the execution of the MFPIP 338 is sent to the information handling system performance optimizer application 344. In an embodiment, information handling system performance optimizer application 344 may form part of a MMCA not native to the information handling system 300. In an alternative embodiment, the MMCA 340 may be a web-based application operating MMCA web APIs 346 that provides the services described herein to multiple users over a network.

The information handling system 300 described with reference to FIG. 3 may represent a transmitting, media source information handling system or a receiving, media sink information handling system in various embodiments. In still other embodiments, information handling system 300 may operate as both a transmitting, media source information handling system and a receiving, media sink information handling system, as may be the case for an information handling system transmitting video of one participant users while simultaneously executing code instructions for the MMCA 340 to display videos or shared screenshare content of other participants within a shared user session of a video conference system.

As described, the information handling system performance optimizer application 344 in an embodiment may operate remotely from the information handling system 300 in an embodiment. For example, the information handling system performance optimizer application 344 may operate on a server, blade, rack, or cloud-based network maintained and controlled by the manufacturer of several information handling systems, or managed by an employer or enterprise owner of several information handling systems, including information handling system 300. In such an embodiment, the information handling system performance optimizer application 344 may operate to monitor certain performance metrics at each of the plurality of such information handling systems (e.g., including 300), perform firmware and software updates, confirm security credentials and compliance, and manage user access across the plurality of information handling systems (e.g., as owned by an employer or enterprise corporation, and including 300). In an alternative embodiment, an agent 371 local to the source or sink information handling system 300 can receive instructions to perform various processes executed by the information handling system performance optimizer application 344 as described herein.

The multimedia processing control API (MPCAPI) 342 in an embodiment may operate, at least in part, as a hub, facilitating communication of video frames and direct media capture instructions and various sensor readings to be provided at the MFPIP 338 for augmentation of the video frames as described herein.

The information handling system 300 in FIG. 3 shows a native MMCA 340 that is executable by a processor of the information handling system 300. The MMCA 340 may coordinate AV data to be sent from and received at the information handling system 300. Additionally, similar to above, the information handling system 300 may be powered on via use of an on switch and a PMU. The PMU may power on an embedded controller 304 that, in an embodiment, executes a basic input/output system (BIOS) and, in an embodiment, an operating system (OS).

In an embodiment, the MFPIP 338 may interface with a number of drivers via streaming media driver 327 of the information handling system 300 as described herein in order to enable an operating system of the information handling system 300 and other computer programs to access the devices used during the execution of the processor of the information handling system. The streaming media driver 327 may be a driver that, when executed by the processor, enables the operating system of the information handling system and other computer programs to distribute the video frames or share screenshare content of operating software applications, as adjusted by operation of the MFPIP 338 as described herein. This data stream provided by the streaming media driver 327 may be sent across a network via, for example, a network interface device of the information handling system 300 as described herein.

The streaming media driver 327 in such an embodiment may receive video or audio samples captured by peripheral cameras or microphones in communication therewith, according to default or optimized media capture instructions, as described with reference to FIG. 2. In another embodiment, the audio driver 329 may receive audio samples captured by a microphone in communication therewith, according to such received media capture instructions. In such an embodiment, the audio driver 329 may operate as a mini-driver or child device to the parent device streaming media driver 327.

Figure 4:
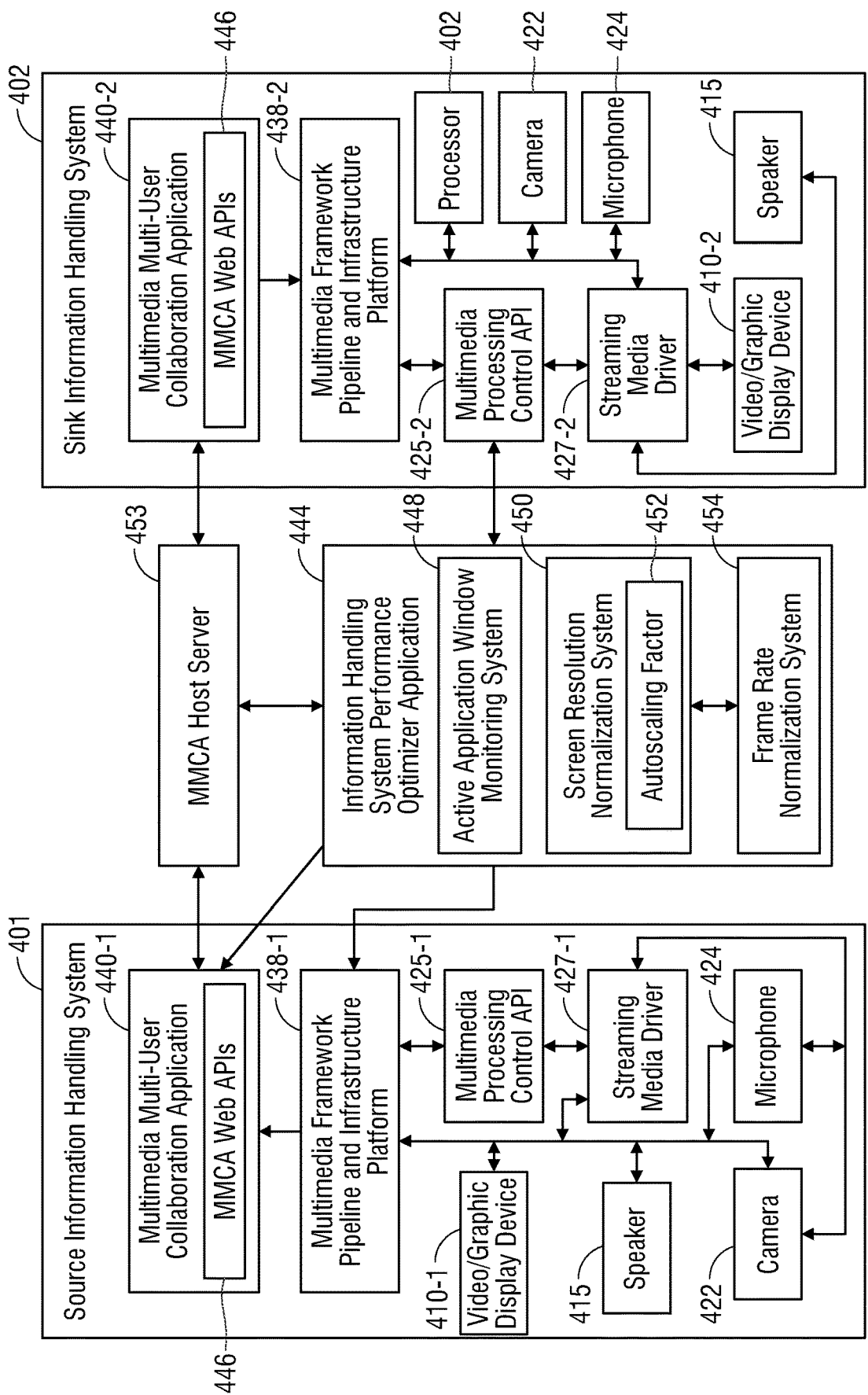
FIG. 4 is a block diagram illustrating a source information handling system and a sink information handling system operatively coupled via a multimedia multi-user collaboration application (MMCA) host server and information handling system performance optimizer application for optimizing information handling system operation of a multimedia, multi-user collaboration application according to an embodiment of the present disclosure.

The streaming media driver 327 may be in communication with the AV processing instruction manager 341 via one or more ports (e.g., as described in greater detail with respect to the device proxy of FIG. 4) such that video or audio samples received by the streaming media driver 327 may be transmitted to the AV processing instruction manager 341 in an embodiment. The streaming media driver 327 may further facilitate the sharing of a presenter's screen during the video conference session. By way of example, the streaming media driver 327 may interface with any application to retrieve video frames descriptive of a graphic user interface (GUI) being presented by that application for display on a presenter's video display device such as 310-1, 310-2 or 310-3. For example, where the presenter is presenting a PowerPoint® presentation, the streaming media driver 327 may receive video frames of the (GUI) or data descriptive of the GUI and send those video frames with other AV data to the participants when the MMCA 340 is placed in a screen sharing mode by the participant. This screen sharing mode may cause the streaming media driver 327 to capture those video frames created by any application executing on any video/graphic display device 310-1, 310-2, or 310-3 described.

The audio driver 329 may be in communication with the AV processing instruction manager 341 such that audio samples received by the audio driver 329 may be transmitted to the AV processing instruction manager 341 (e.g., via the audio processing engine 390, or via the streaming media driver 327) in an embodiment. In such a way, the AV processing instruction manager 341 may direct retrieval of a video sample captured at a camera operably connected to information handling system and retrieval of an audio sample captured at a microphone operably connected to information handling system.

The audio driver 329 may interface with the operating system and be executed by the processor in order to drive, for example, a specific audio device such as a microphone and an audio card. The audio driver 329 may, in the embodiments herein, interface with an audio processing engine 390 that includes a voice mode effects audio processing object (MFX APO) 391. The driver may allow the MFX APO 391 to interface with the operating system in order to provide audio during the video conference session executed on the MMCA 140. In an embodiment, the MFX APO 391 provides software based digital signal processing for the video conference session. Examples of MFX APO 391 include graphic equalizers, reverb, tremolo, Acoustic Echo Cancellation (AEC) and Automatic Gain Control (AGC). In an embodiment, the MFX APO 391 may be COM-based, real-time, in-process objects. During execution of the MFX APO 391, a background noise reduction module or any other audio-based AV processing instruction module may be executed to adjust the audio output during the video conference session.

The MFPIP 338 may include a driver stack working with the streaming media driver 327 that operates other drivers such as those associated with peripheral devices of the information handling system. For example, and in the embodiments here, the peripheral devices may include a camera that captures video frames and streams those frames to the MFPIP 338 as described herein. The driver stack working with the streaming media driver 327 may be a combination of drivers that plug into each other with each of the drivers adding to a chain of drivers that may be executed in serial by the processor. For example, the driver associated with the video camera of the information handling system may be executed prior to any other devices or sensors so that a video frame may first be obtained prior to the data from the sensors being used to, for example, adjust the visual composition of the video frame.

The driver stack may include, as part of the streaming media driver 327, a display driver 318. The display driver 318 may enable an operating system of the information handling system 300 and other computer programs to access one or more video/graphic display devices 310-1, 310-2, 310-3. For example, the display driver 318 may interface with a first video/graphic display device 310-1 that may be presenting a GUI presented by a first application (e.g., a Word® document). The display driver 318 may also, in an embodiment, interface with a docking station 358 that operatively couples one or more external video/graphic display devices 310-2, 310-3 to the information handling system 300. In this embodiment, each of the external video/graphic display devices 310-2, 310-3 may also be presenting a GUI generated via the execution of a second application (e.g., a PowerPoint® presentation) and third application (e.g., an Excel® spreadsheet) by the processor or embedded controller 304 of the information handling system 300.

During operation, any one of these video/graphic display devices 310-1, 310-2, 310-3 may be determined to be the "presenting" video/graphic display device 310-1, 310-2, 310-3 when, for example, the user is interacting with any of the GUIs presented thereon. Each of these GUIs may be presented by the presenter during the video conference session when, for example, a selection at the MMCA 340 indicates that the presenter is "sharing" this content. In some examples, a presenter during the video conference session may select the first video/graphic display device 310-1 or any of the external video/graphic display devices 310-2, 310-3 as the "presenting" video/graphic display device 310-1, 310-2, 310-3 used to screenshare content during the video conference session. In an embodiment, the information handling system 300 may be undocked or docked with the docking station 358 so that the information handling system 300 is operatively uncoupled or coupled, respectively, to the external video/graphic display devices 310-2, 310-3. When docked, the active application window monitoring system 348 described herein may detect this docking and determine which among any of the video/graphic display device 310-1, 310-2, 310-3 is the "presenting" video/graphic display device 310-1, 310-2, 310-3. When undocked, the active application window monitoring system 348 may determine that the video/graphic display device 310-1 is the only video/graphic display device 310-1 made available and determine that the video/graphic display device 310-1 is the presenting video/graphic display device 310-1. In these examples, when the active application window monitoring system 348 determines which video/graphic display device 310-1, 310-2, 310-3 is the presenting video/graphic display device 310-1, 310-2, 310-3, the active application window monitoring system 348 may also determine the resolution of the presenting video/graphic display device 310-1, 310-2, 310-3 pursuant to the methods described herein.

The MFPIP 338 may also include an AV processing instruction manager 341. The AV processing instruction manager 341 may be any processor that coordinates operation of the AV processing with the information handling system performance optimizer application as described herein and cause, for example, one or more AV processing instruction modules to be used to visually and audially transform the one or more video frames and audio samples during the execution of the video conference session. The AV processing instruction manager 341 may interface with a video processing engine 380 to cause, for example, an autoscaling factor 352 to be executed so as to apply the appropriate visual changes to each video frame according to optimized settings.

In an embodiment, the information handling system performance optimizer application 344 may also execute a frame rate normalization system 354. Similar to the execution of the screen resolution normalization system 350, the execute of the frame rate normalization system 354 may cause the information handling system performance optimizer application 344 to request frame rate data from each of the participating information handling systems during the video conference session and cause data to be sent to each of the participating information handling systems in order to adjust for disparate frames rates among the participating endpoint devices. The execution of this process may eliminate any choppiness in video streaming that is discernable by any user of the participating information handling systems. In an embodiment, the adjustment of a frame rate may cause each display to operate at a lowest frame rate among the participating information handling systems.

As described herein, in order to facilitate the exchange or execution of the correct autoscale factor, the information handling system 300 or the information handling system performance optimizer application 344 may include an active application window monitoring system 348. As described, the active application window monitoring system 348 may facilitate the exchange of an autoscale factor by detecting the resolution of the video/graphic display devices 310-1, 310-2, or 310-3 used by a presenter to screenshare content during the video conference session (e.g., the information handling systems 300). By detecting the specific resolution of the video/graphic display devices 310-1, 310-2, or 310-3 used by the presenter to screenshare content during the video conference session, such as from display driver 318 settings, the active application window monitoring system 348 may pass this information onto the information handing system performance optimizer application 344, for example, and screen resolution normalization system 350 in order to determine and use or receive and use the proper autoscaling factor to achieve the best visual results as any given video/graphic display device used by any participant on the video conference session to view the screenshare content. It is understood in the present specification that the frame rate may also be detected by the active application window monitoring system 348 at the presenting information handling system (e.g., 300) in order to include the frame rate of a presenting video/graphic display devices of a presenting information handling system with the autoscaling factors.

FIG. 4 is a block diagram illustrating a source information handling system 401 and a sink information handling system 402 operatively coupled via a MMCA host server 435 and information handling system performance optimizer application 444 for optimizing information handling system operation of a MMCA 440-1, 440-2 according to an embodiment of the present disclosure. This optimization includes the provisioning of one or more autoscaling factors 452 to each of the source information handling system 401 and sink information handling system 402, as well as any other participating information handling system of the video conference session, information handling system 401 as described herein in order to adjust video frames or shared screenshare content sent and received from either, 402. User sessions may be hosted and coordinated by a MMCA host server 453 located remotely from, but in communication with one or more source information handling systems (e.g., 401) and one or more sink information handling systems (e.g., 402) via a network.

In an embodiment, the operations and processes conducted by the source information handling system 401 may be similar to those of the sink information handling system 402. Because the source information handling system 401 and sink information handling system 402 are engaged in the execution of an MMCA 440-1, 440-2 and participating in a video conference session, each of the source information handling system 401 and sink information handling system 402 are sending and receiving video frames among each other so that each user of the source information handling system 401 and sink information handling system 402 can view and hear, in real-time, the image and sounds produced by the other user. Therefore, the present specifications contemplate that the source information handling system 401 and sink information handling system 402 may perform concurrently those processes of the other at any given time.

As described herein, the source information handling system 401 and sink information handling system 402 each include a MMCA 440-1, 440-2. The MMCA 440-1, 440-2 may be any application that, when executed by the processor, initiates or conducts a video conference session between a plurality of users such as between the user of the source information handling system 401 and the sink information handling system 402. With the MMCA 440-1, 440-2 and per the user selections, the MMCA 440-1, 440-2 may present each video frame to the user at a respective video/graphic display device 410-1 at the source information handling system 401 or the video/graphic display device 410-2 at the sink information handling system 402. In the context of the present specification and FIG. 4, either of the source information handling system 401 and the sink information handling system 402 may be a presenting information handling. A presenting information handling system may share screenshare content with other participants in order to provide additional subject matter to be presented during the video conference session. This screenshare content may include documents (e.g., Word® documents), presentations (e.g., PowerPoint® presentations), spreadsheet, pictures, or other software application screenshare content audio used to facilitate the discussion during the video conference session. The sharing of this screenshare content by a presenter having one or more video/graphic display devices (e.g., 410-1) that have a resolution relatively higher than other participants' video/graphic display devices (e.g., 410-2) results in the screenshare content appearing small on the recipients' display devices. Other screenshare content issues or artefacts may include blockiness or blurring of screenshare content, and AV data transmission delays during transfer and upscaling or downscaling of the AV data. Thus, among the resolution data shared, the presenter's resolution may be shared in order to better determine a proper autoscaling factor used to upscale or downscale the AV data presented by the presenter so that these artefacts may not be seen at the other respective display devices (e.g., 410-2) of the participant endpoint devices.

Again, the information handling system performance optimizer application 444 may determine the autoscaling factor 452 as it relates to a window that an active application being shared in by a presenter. In this embodiment, therefore, the information handling system performance optimizer application 444 does not autoscale or determine an autoscaling factor 452 to be applied to those video frames of the entire display but instead only the video frames of the GUI of those applications sent to the recipients (e.g., sink information handling system 402) by the presenter (e.g., source information handling system 402). For example, where a presenter is presenting a PowerPoint® presentation, the information handling system performance optimizer application 444 may cause the AV data associated with only the video frames of the GUIs created by the execution of the PowerPoint® presentation to be subjected to the autoscaling factor 452 prior to transmission of those video frames of the GUI. This may allow a presenter to select specific application GUIs to be presented to the other participants of the video conference session. To accomplish this, instead of the MMCA 440-1 providing an option to the presenter to share an entire screen (e.g., one of the video/graphic display devices 410-1), an option may be presented by the MMCA 440-1 to the presenter to select an option to specify which executing application GUIs to share with the participating information handling systems.

The MFPIP 438-1, 438-2 may include audio or video processing systems of the source information handling system 401 or sink information handling system 402 that applies an autoscaling factors 452 to each of the video frames created as the video camera (e.g., webcam) or displayed software application screenshare content to be shared in video frames and provides those video frames to the video conference session executed by the MMCA 440-1, 440-2. Execution of the autoscaling factors 452 by the source information handling system 401 and sink information handling system 402 may prevent the visual scaling discrepancies detected between, for example, a source display device (e.g., 410-1) having a high resolution (e.g., 1080i/1080p) and a remote display device (e.g., 410-2) having a relatively lower resolution (e.g., 720p).

Each of the source information handling system 401 and sink information handling system 402 may include a streaming media driver 427-1, 427-2. As described herein, the streaming media driver 427-1, 427-2 in such an embodiment may receive video or audio samples captured by peripheral cameras or microphone or screen images generated for display at presenter's information handling system (e.g., 401) for software application screenshare content in communication therewith, according to default or optimized media capture instructions. The streaming media driver 427-1, 427-2 may further the sharing of a presenter's screen during the video conference session. By way of example, the streaming media driver 427-1, 427-2 may interface with any software application executed by a presenting information handling system (e.g., source information handling system 401) to display content on one or more presenter information handling system video/graphic display devices. The streaming media driver 427-1 or 427-2 may be accessed to retrieve video frames descriptive of a graphic user interface (GUI) being presented by that application. For example, where the presenter is presenting a PowerPoint® presentation, the streaming media driver 427-1, 427-2 may receive video frames of the (GUI) or data descriptive of the GUI and send those video frames with other AV data to the participants when the MMCA 440-1, 440-2 is placed in a screen sharing mode by the participant. This screen sharing mode may cause the streaming media driver 427-1, 427-2 to capture those video frames created by any application executing on any video/graphic display device 410-1 of the presenter information handling system 400 as described.

In another embodiment, the audio driver may receive audio samples captured by the microphone 424, for example, in communication therewith, according to such received media capture instructions. In such an embodiment, the audio driver may operate as a mini-driver or child device to the parent device streaming media device driver 427-1, 427-2.

The streaming media device driver 427-1, 427-2 may be in communication with an AV processing instruction manager via one or more ports (e.g., as described in greater detail with respect to the of FIG. 4) such that video shared screenshare content, or audio samples received by the streaming media device driver 427-1, 427-2 may be transmitted to an AV processing instruction manager, in an embodiment. The audio driver may be in communication with the AV processing instruction manager such that audio samples received by the audio driver may be transmitted to the AV processing instruction manager (e.g., via the audio processing engine, or via the streaming media driver, for example) in an embodiment. In such a way, the AV processing instruction manager may direct retrieval of a video sample captured at a camera 422 or displayed on a presenter information handling system (e.g., 401) video/graphic display device 410-1 operably connected to information handling system 401 and retrieval of an audio sample captured at a microphone operably connected to information handling system 401.

The source information handling system 401 and sink information handling system 402 may further include a MPCAPI 425-1, 425-2. The MPCAPI 425-1, 425-2 in an embodiment may operate to facilitate communication between various applications, controllers, and drivers of the information handling system in an embodiment. For example, the MPCAPI 425-1, 425-2 may interface between a MFPIP 438-1, 438-2 and the sensors of the sensor array such as the camera 422.

In the embodiment, the source information handling system 401, as well as the sink information handling system 402, may include a microphone 424 used to receive sounds from the user and, with the audio driver and other audio processing devices, create audio used to accompany the video output by the MMCA 440-1, 440-2. The source information handling system 401, as well as the sink information handling system 402, may include a camera 422 used to capture frames of the users while engaged with the video conference session executed by the MMCA 440-1, 440-2. Still further, the source information handling system 401, as well as the sink information handling system 402, may include a speaker 415 to produce audio output and a video/graphics display device 410-1 and 410-2 to produce video output to the participants of the video conference session.

As descried herein, the streaming media driver 427-1, 427-2 may interface with a display driver. The display driver may enable an operating system of the information handling systems 401, 402 and other computer programs to access one or more video/graphic display devices 410-1, 410-2. For example, the display driver may interface with a first video/graphic display device 410-1 of a presenting information handling system (e.g., source information handling system 401) that may be presenting a GUI presented by a first application (e.g., a PowerPoint® presentation document) executed by a processor. The display driver may also, in an embodiment, interface with one or more external video/graphic display devices, for example, in order to allow multiple applications to be presented to the presenter during operation. In this embodiment, each of the external video/graphic display devices may also be presenting a GUI generated via the execution of a second application (e.g., a computer aided design software technical drawing) and third application (e.g., an Excel® spreadsheet) by the processor or embedded controller of the information handling system (e.g., source information handling system 401).

During operation, any one of these video/graphic display devices 410-1 may be determined to be the "presenting" video/graphic display device 410-1 when, for example, the user is interacting with any of the GUIs presented thereon such as to share during a videoconference session. Each of these GUIs may be presented by the presenter during the video conference session when, for example, a selection at the MMCA 440-1 indicates that the presenter is "sharing" this content. In some examples, a presenter during the video conference session may select the first video/graphic display device 410-1 or any of the external video/graphic display devices as the "presenting" video/graphic display device 410-1 used to screenshare content during the video conference session. In an embodiment, the information handling system (e.g., source information handling system 401) may be undocked or docked with a docking station so that the information handling system 401 is operatively uncoupled or coupled, respectively, to the external video/graphic display devices 410-1. When docked, the active application window monitoring system 448 described herein may detect this docking and determine which among any of the video/graphic display device 410-1 is the "presenting" video/graphic display device 410-1. When undocked, the active application window monitoring system 448 may determine that the video/graphic display device 410-1 is the only video/graphic display device 410-1 made available and determine that the video/graphic display device 410-1 is the presenting video/graphic display device 410-1. In these examples, when the active application window monitoring system 448 determines which video/graphic display device 410-1 is the presenting video/graphic display device 410-1, the active application window monitoring system 448 may also determine the resolution of the presenting video/graphic display device 410-1 pursuant to the methods described herein.

FIG. 4 shows the interactions between the different hardware, software, and firmware components of the source information handling system 401 and sink information handling system 402 relative to an information handling system performance optimizer application 444. During operation of the source or sink information handling systems 401, 402, the MICA 440-1, 440-2 may be executed. During operation of the information handling systems 401, 402, their respective processors may interface with an information handling system performance optimizer application 444. The information handling system performance optimizer application 444 may perform various processes used to determine a resolution of each display device 410-1, 410-2 of each information handling system 401, 402, and provide one or more autoscaling factors 452 used to automatically upscale or downscale video frames that are sent or received by the information handling systems 401, 402. In an embodiment, the information handling system performance optimizer application 444 may interface with the active application window monitoring system 448 described herein. The active application window monitoring system 448 may facilitate the exchange of an autoscale factor by detecting the resolution of the video/graphic display devices used by the presenter to screenshare content during the video conference session. By detecting the specific resolution of the video/graphic display devices used by the presenter to screenshare content during the video conference session, the active application window monitoring system may pass this information onto the information handling system performance optimizer application 444 and screen resolution normalization system 450 in order to determine and use or receive and use the proper autoscaling factor to achieve the best visual results as any given video/graphic display device 410 used by any participant (e.g., the source information handling system 401 and the sink information handling system 402) on the video conference session to view the screenshare content. It is understood in the present specification that the frame rate may also be detected by the information handing system performance optimizer application 444 executing the frame rate normalization system 454 and the autoscaling factor may also be determined based upon the detected frame rate of any given video/graphic display devices 410-1 or 410-2 including the frame rate of a presenting video/graphic display devices 410-1 of a presenting information handling system. FIG. 4 shows the active application window monitoring system 448 as part of the information handling system performance optimizer application 444 in an embodiment. The present specification further contemplates that each of the source information handling system 401 and sink information handling system 402 may include its own active application window monitoring system 448 such that resolution data and frame rate data may be automatically sent from the source information handling system 401 and sink information handling system 402 pursuant to the methods described herein.

In an embodiment, the information handling system performance optimizer application 444 may perform various processes used to initiate an OOB communication with each participating endpoint device and requests data descriptive of a resolution of a presenting display at each participating endpoint device. The information handling system performance optimizer application 444 may, upon receiving the data descriptive of the resolution of the presenting displays at each participating endpoint device and determine an autoscaling factor 452 descriptive of how to upscale and downscale video frames of the AV data with screenshare content received at each of the participating endpoint devices based on the data descriptive of the resolution of the presenting displays. The execution of the information handling system performance optimizer application 444 may also cause the autoscaling factor 452 to be transmitted to each participating endpoint device. The autoscaling factors 452 is based on the resolution of the presenting displays at each participating endpoint device. In the embodiment shown in FIG. 4, the information handling system performance optimizer application 444 may be remote and central to a plurality of information handling systems 401, 402 and may operate to coordinate the delivery of the autoscaling factors 452 amongst the endpoint devices participating in the video conference session as described herein.

The autoscaling factor 452 may be determined or formed based on any disparities in resolutions of the video/graphic display devices 410-1, 410-2 to be used for displaying software application screenshare content between any given endpoint devices such as the information handling systems 401, 402 descried herein. In an embodiment, the information handling system performance optimizer application 444 may determine the autoscaling factor 452 by dividing the resolution of the presenting display 410-1 of a first information handling system (e.g., a presenter or host of the video conference session) by the resolution of the presenting display (410-2) of the participant (e.g., any given endpoint device). In these embodiments, the autoscaling factors 452 relayed across the network of endpoint devices by the information handling system performance optimizer application 444 may be different for each endpoint device. The autoscaling factors 452 may be used by a MFPIP 438-1, 438-2 of any information handling system 401, 402 for post-processing of the video frames received at the endpoint device of the individual participants. Alternatively, or additionally, the autoscaling factors 452 may be used by any MFPIP 438-1, 438-2 at any information handling system 401, 402 to pre-process any video frames to be sent out from the information handling system 401, 402. Thus, in an embodiment, each information handling systems 401, 402 may receive an autoscaling factor 452 to pre-process video frames being sent to other information handling systems 401, 402 and post-process video frames received by each information handling system 401, 402. By pre-processing and post-processing the video frames, the autoscaling factors 452 may eliminate any blockiness that may result in executing a single autoscaling factor 452 to video frames that have been either received or sent.

In an embodiment, the information handling system performance optimizer application 444 may also execute a frame rate normalization system 454. Similar to the execution of the screen resolution normalization system 450, the execute of the frame rate normalization system 454 may cause the information handling system performance optimizer application 444 to request frame rate data from each of the participating information handling systems 401, 402 during the video conference session and cause data to be sent to each of the participating information handling systems in order to adjust for disparate frames rates among the participating endpoint devices. The execution of this process may eliminate any choppiness in video streaming that is discernable by any user of the participating information handling systems. In an embodiment, the adjustment of a frame rate may cause each display to operate at a lowest frame rate among the participating information handling systems.

Figure 5:
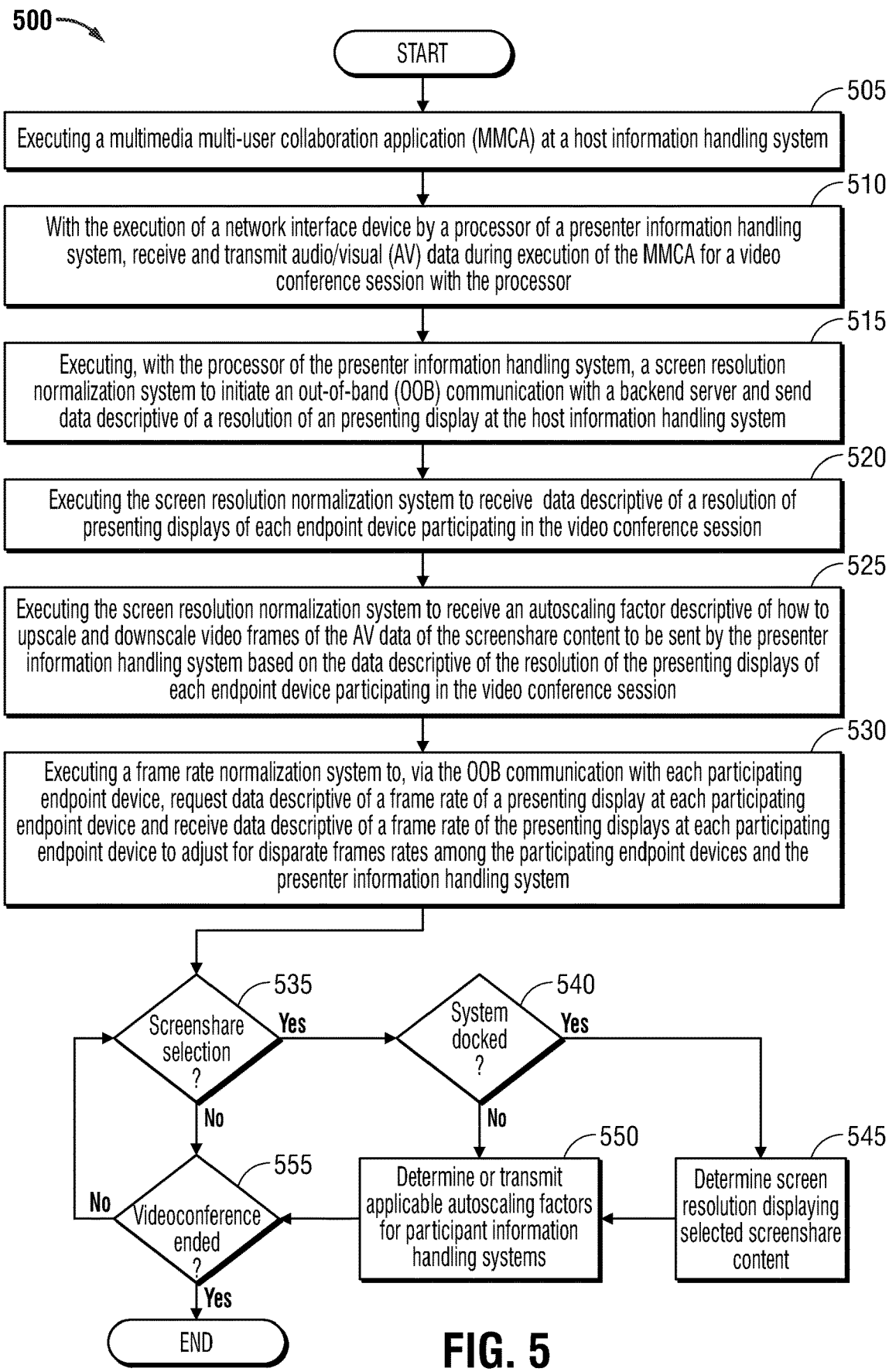
FIG. 5 is a flow diagram illustrating a method of normalizing shared video frames during a video conference session executed by a multimedia multi-user collaboration application (MMCA) according to an embodiment of the present disclosure.

FIG. 5 is a flow diagram illustrating a method 500 of normalizing shared screenshare content video frames during a video conference session executed by a multimedia multi-user collaboration application (MMCA) according to an embodiment of the present disclosure. The method 500 described in connection with FIG. 5 may be conducted by a host server information handling system that executes a multimedia multi-user collaboration application (MMCA) on behalf of a number of network information handling systems sometimes called client devices, for example. Alternatively, other information handling systems may be used to conduct the method 500 described herein and the present specification contemplates the use of these other types of information handling systems described herein. Among these other types of information handling systems includes a presenting information handling system used to generate and share screenshare content with other participants in order to provide additional subject matter to be presented during the video conference session. This screenshare content may include documents (e.g., Word® documents), presentations (e.g., PowerPoint® presentations), spreadsheets, pictures, and audio or other software application screenshare content used to facilitate the discussion during the video conference session. The presenter may optionally select a screen or content to be shared during a video conference session via the MMCA.

The method 500 may begin, at block 505, with executing a multimedia multi-user collaboration application (MMCA) at a host information handling system. During execution of the MMCA to engage two or more participant information handling systems in a video conference session, the video frames received at a MFPIP, for example, from a video camera may be used, in real-time to present streaming video to other client devices operatively coupled to the information handling system. The MMCA may be any application that, when executed by the processor, initiate a video conference session between a plurality of users such as between the user of the information handling system and another remote user of another information handling system. MMCA may utilize an MMCA central facility server, such as the information handling system in an embodiment, to engage in the video conference. With the MFPIP and MPCAPI and per the operations of the information handling system performance optimizer application described herein, the MMCA may cause video frames to be transmitted to the MFPIP for processing, reprocessing, encoding, decoding, capture, and display and present each video frame to the user at the video/graphic display device.

In an embodiment, the presenter may have one or more software applications being executed by a processor and generating content (windows, etc.) displayed on one or more display devices at the presenter's information handling system. Selection of such displayed software application content for sharing will make such selected content screenshare content for transmission to a receiving or participant information handling system. The display device displaying such selected screenshare content may be identified as an active presenting display device.

The method 500, at block 510, may continue with the execution of a network interface device, by a processor, to receive and transmit audio/visual (AV) data during execution of the MMCA for a video conference session with the processor. The network interface device can provide connectivity to a network, e.g., a wide area network (WAN), a local area network (LAN), wireless local area network (WLAN), a wireless personal area network (WPAN), a wireless wide area network (WWAN), or other networks. Connectivity may be via wired or wireless connection. The network interface device may operate in accordance with any wired or wireless data communication standards. The network interface device may also operate to transmit the screenshare content from the presenting information handling system as described herein.

The method 500 may continue at block 515 with executing a screen resolution normalization system to initiate an out-of-band (OOB) communication with a backend server and send data descriptive of a resolution of a presenting display at the host information handling system with a processor of the information handling system. As described herein, the host information handling system may be an information handling system, such as an endpoint device, that hosts the video conference session executed by the MMCA. It is appreciated that although the present example describes a host information handling system as initiating the communication of resolution data, any information handling system participating in the video conference session may initiate this process. Although a host information handling system may host the video conference session executed by the MMCA, another information handling system may act as a presenting information handling system to provide the presentation of screenshare content to the other endpoint devices as described.

Resolutions of the various presenting display devices may include, for example, a 1080i/1080p resolution, a 720p resolution, a 576i/576p resolution, a DV/480i.480p resolution, among others. Indeed, the different resolutions of each of these presenting display devices may include any aspect ratio and may include high-definition aspect ratios, video graphics array aspect ratios, extended graphics array aspect ratios, and quad extended graphics array aspect ratios, among others. In an embodiment, the resolution of a presenting display device of a presenting information handling system may also be used to determine the autoscaling factor used by other information handling systems (e.g., endpoint devices) engaged in the video conference session. Additionally, because the presenting information handling system (or any other information handling system engaged in the video conference session) may include a plurality of video/graphic display devices, an active application window monitoring system may be executed by, at least, the presenting information handling system. As described herein, the presenter's information handling system may be undocked or docked with the docking station so that the information handling system is operatively uncoupled or coupled, respectively, to external video/graphic display devices, for example. When docked, the active application window monitoring system described herein may detect this docking and determine which among any of the video/graphic display device is the "presenting" video/graphic display device. When undocked, the active application window monitoring system may determine that the video/graphic display device is the only video/graphic display device made available and determine that the video/graphic display device is the presenting video/graphic display device. In these examples, when the active application window monitoring system determines which video/graphic display device is the presenting video/graphic display device, the active application window monitoring system may also determine the resolution of the presenting video/graphic display device pursuant to the methods described herein.

The active application window monitoring system may detect the resolution of the video/graphic display devices used by the presenter to screenshare content during the video conference session using the information handling system. By detecting the specific resolution of the video/graphic display devices used by the presenter for user selection of screenshare content to be shared during the video conference session, the active application window monitoring system may pass this information onto the information handing system performance optimizer application and screen resolution normalization system in order to determine and use or receive and use the proper autoscaling factor to achieve the best visual results with any given video/graphic display device used by any participant on the video conference session to view the screenshare content. It is understood in the present specification that the frame rate may also be detected by the information handling system performance optimizer application executing the frame rate normalization system and the autoscaling factor may also be determined based upon the detected frame rate of any given video/graphic display devices including the frame rate of a presenting video/graphic display devices of a presenting information handling system.

By way of example, the presenting information handling system may include a first display device having a first screen resolution and frame rate that is presenting a document (e.g., Word® document). The presenting information handling system may also include a second display device having a second screen resolution and frame rate that is presenting a presentation (e.g., PowerPoint® presentation). In this example, the presenter may periodically switch from the first display device to the second display device in order to present information during the video conference session. As such the active application window monitoring system may be used to automatically determine which display device is currently activated for use to share screenshare content by the presenter.

The method 500 may continue at block 520 with executing the screen resolution normalization system to receive data descriptive of a resolution of presenting displays of each endpoint device participating in the video conference session including the resolution of the presenter's presenting display device. As described herein, each of the information handling systems may include a screen resolution normalization system that gathers and reports the resolution of a presenting display of the information handling system to, for example, a backend server (e.g., host server) or the host information handling system that also includes a screen resolution normalization system. The relaying of this data may allow each participating endpoint device to know the resolution of the presenting displays of each other endpoint device. In the embodiment where a host server is used, this data is maintained and aggregated at the host server.

Having obtained the resolution data of the presenting displays of each other endpoint device, the method 500 may continue at block 525 with executing the screen resolution normalization system to receive an autoscaling factor descriptive of how to upscale and downscale video frames of the AV data of the screenshare content to be sent by the presenter information handling system based on the data descriptive of the resolution of the presenting displays of each endpoint device participating in the video conference session. The autoscaling factor may be determined or formed based on any disparities in resolutions between any given endpoint devices such as the presenting information handling system descried herein and any other participating information handling systems.

In an embodiment, the information handling system performance optimizer application may determine the autoscaling factor by dividing the resolution of the presenting display of a first information handling system (e.g., a presenter or host of the video conference session) by the resolution of the presenting display of the participant (e.g., any given endpoint device). Again, the autoscaling factor may be applied to those video frames created by the GUI of the executed application being shared by the presenter. Thus, in this embodiment, the entire display of the presenter is not autoscaled but instead only those portions representative of the screenshare content (e.g., executed application GUIs)

sent to the recipients by the presenter. For example, where a presenter is presenting a PowerPoint® presentation, the information handling system performance optimizer application 344 may cause the AV data associated with only the video frames of the GUIs created by the execution of the PowerPoint® presentation to be subjected to the autoscaling factor 352 prior to transmission of those video frames of the GUI. This may allow a presenter to select specific application GUIs to be presented to the other participants of the video conference session.

In these embodiments, the autoscaling factors relayed across the network of endpoint devices by the information handling system performance optimizer application may be different for each endpoint device. For example, the information handling system performance optimizer application may receive resolution data from a first endpoint device (e.g., the presenting information handling system) that indicates the presenting display device has a resolution of 1080p. Additionally, the information handling system performance optimizer application may receive resolution data from a second endpoint device that indicates the presenting display device has a resolution of 720p. In this embodiment, the autoscaling factor for the first endpoint device used to autoscale video frames sent to the second endpoint device may be 1080/720=1.5. This means that the first endpoint device autoscales video frames by downscaling each video image by a factor of 1.5. Similarly, the autoscaling factor for the second endpoint device used to autoscale video frames sent to the first endpoint device may be 0.667 (e.g., 720/1080). These similar autoscaling factors may be used instead on any video frames received at either the first endpoint device (e.g., upscale video frames by a factor of 0.667) or second endpoint device (e.g., downscale video frames by a factor of 1.5). Alternatively, or additionally, further autoscaling factors may be used as the first endpoint device sends video frames and the second endpoint device receives those video frames and visa-versa. In an embodiment, the autoscaling factors may also be effective to normalize size of screenshare content at one or more participants' information handling systems.

The autoscaling factors may be used by a MFPIP of any information handling system for post-processing of the video frames received at the endpoint device of the individual participants. Alternatively, or additionally, the autoscaling factor may be used by any MFPIP at any information handling system to pre-process any video frames to be sent out from the information handling systems. Thus, in an embodiment, each information handling system may receive an autoscaling factor to pre-process video frames being sent (e.g., by a presenting information handling system) to other information handling systems and post-process video frames received by each information handling system. By pre-processing and post-processing the video frames, the autoscaling factors may eliminate any blockiness that may result in executing a single autoscaling factor to video frames that have been either received or sent.

The method 500 may continue at block 530 with executing a frame rate normalization system to, via the OOB communication with each participating endpoint device, request data descriptive of a frame rate of an presenting display at each participating endpoint device and receive data descriptive of a frame rate of the presenting displays at each participating endpoint device to adjust for disparate frames rates among the participating endpoint devices and the presenter information handling system. Similar to the execution of the screen resolution normalization system, the execution of the frame rate normalization system may cause the information handling system performance optimizer application to request frame rate data from each of the participating information handling systems during the video conference session and cause data to be sent to each of the participating information handling systems in order to adjust for disparate frames rates among the participating endpoint devices. The execution of this process may eliminate any choppiness in video streaming that is discernable by any user of the participating information handling systems. In an embodiment, the adjustment of a frame rate may cause each display to operate at a lowest frame rate among the participating information handling systems.

The method 500 may also include, at block 535, with determining whether the user, via the MMCA has selected to present screenshare content at a display device to be shared with the participants of the video conference session. In an embodiment, the presenter may select a screensharing button or softkey on the MMCA interface in order to be designated as the presenter during the video conference session. The status as a presenter may change during the video conference session and the MMCA may detect such changes as they occur. Still further, in an embodiment, the presenter may request to share the screenshare content on any display device at the MMCA and may be allowed to share this screenshare content when approval is received from, for example, a host participant of the video conference session.

Where the presenter has not requested to share screenshare content, the method 500 may continue at block 555 with determining whether the video conference session has ended. The video conference session may end, in an embodiment, by logging out of the video conference session and ending the execution of the MMCA. Where the video conference session has ended the method 500 may end here. Where the video conference session has not ended, the method 500 may continue monitoring for screensharing selection with returning to the processes described in connection with block 535.

Where the presenter has requested to share screenshare content at block 535, the method 500 may continue to block 540 with determining whether the information handling system of the presenter is docked with a docking station. As descried herein, the presenter's information handling system may interface with a docking station that includes one or more external video/graphic display devices used by the presenter to view a plurality of GUIs. The presenter may use one or more of these video/graphic display devices to share screenshare content with the participants of the video conference session. During operation, one of the pluralities of video/graphic display devices may be selected by the user to be the presenting video/graphic display device. Again, in an embodiment, the active application window monitoring system described herein may detect a selection of the AV data with any other software application screenshare content being shared on that selected display device. For example, a presenter may have a first video/graphic display device that may be presenting a GUI presented by a first application (e.g., a Word® document). One or more external video/graphic display devices may also be presenting a GUI generated via the execution of a second application (e.g., a PowerPoint® presentation) and third application (e.g., an Excel® spreadsheet) by the processor or embedded controller of the information handling system as well. The selection of the video/graphic display device used by the presenter to present screenshare data may identify the presenting video/ graphic display device for autoscaling and also determine which of these application-associated screenshare content is to be shared.

Where the presenter's information handling system is docked at block 540, the method 500 may include determining a screen resolution of the video/graphic display device selected to share the screenshare content at block 545. Again, where the first video/graphic display device in the example is presenting a GUI presented by a first application (e.g., a Word® document), that software application screenshare content is to be shared. Similarly, where either of the external video/graphic display devices is selected, the GUIs generated via the execution of a second application (e.g., a PowerPoint® presentation) and third application (e.g., an Excel® spreadsheet) by the processor or embedded controller, respectively, of the information handling system is selected as the screenshare content. Each of these display devices may have an associated resolution and frame rate used to share the screenshare content with the participants. At block 545, the resolution of the selected video/graphic display device may be determined.

The method 500 further includes determining or transmitting an applicable autoscaling factor to be used by the participant information handling systems during the video conference session at block 550. In an embodiment, the autoscaling factor is dependent on the determined resolution of the presenting video/graphic display device among other factors including the respective resolutions of each participants' video/graphic display device. As described herein, data descriptive of each participants' video/graphic display device is received by the presenter's information handling system in order to determine and transmit the autoscaling factor. The method 500, at this point, may continue to block 555 as described herein. Where the video conference session has ended at block 555, the method 500 may end. If the video conference session has not ended at block 55, the method continue monitoring for changes to the presenter or screenshare content selected for sharing during a video conference at block 535.

In an embodiment, the active application window monitoring system of the information handling system may determine that the presenter's information handling system is not docked at block 540, the process may continue at block 550 with determining, using the resolution data from the single video/graphic display device, and/or transmitting the applicable autoscaling factor as described. At this point, the method 500 may continue at block 555 and end if the video conference session has ended or return to block 535 for continued monitoring for changes in screenshare content selection or changed presenter designation as described.

Figure 6:
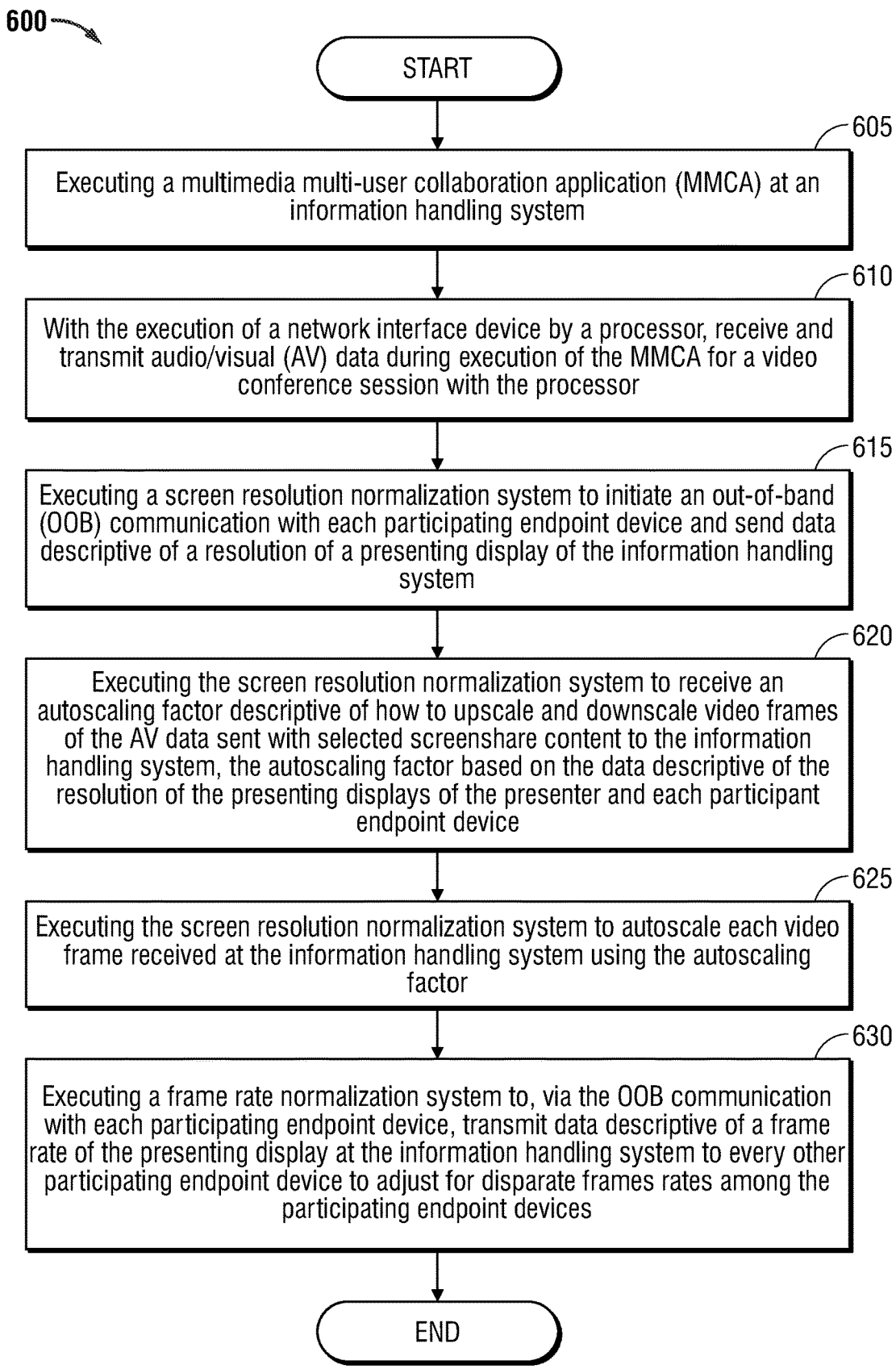
FIG. 6 is a flow diagram illustrating a method of normalizing shared video frames during a video conference session executed by a multimedia multi-user collaboration application (MMCA) according to another embodiment of the present disclosure.

FIG. 6 is a flow diagram illustrating a method of normalizing shared screenshare content video frames during a video conference session executed by a multimedia multi-user collaboration application (MMCA) according to another embodiment of the present disclosure. The method 600 may be conducted by a source or sink information handling system, for example, that produces AV data for transmission to other information handling systems during execution of a MMCA as described herein. In an embodiment, the present may select a display screen or software application displaying content on a presenting display device to be shared as screenshare content with the participants' information handling systems.

The method 600 may include executing, with a processor, a multimedia multi-user collaboration application (MMCA) at an information handling system at block 605. The MMCA may be any application that, when executed by the processor, initiates a video conference session between a plurality of users such as between the user of the information handling system and another remote user of another information handling system. MMCA may utilize an MMCA central facility server, such as the information handling system in an embodiment, to engage in the video conference. In an embodiment, a user may sign-in to the video conference session executed by the MMCA using, for example, a default password.

The method 600 may, at block 610, may continue with the execution of a network interface device, by a processor, to receive and transmit audio/visual (AV) data during execution of the MMCA for a video conference session with the processor. The network interface device can provide connectivity to a network, e.g., a wide area network (WAN), a local area network (LAN), wireless local area network (WLAN), a wireless personal area network (WPAN), a wireless wide area network (WWAN), or other networks. Connectivity may be via wired or wireless connection. The network interface device may operate in accordance with any wired or wireless data communication standards.

The method 600 may include, at block 615, executing a screen resolution normalization system to initiate an out-of-band (OOB) communication with each participating endpoint device and send data descriptive of a resolution of a presenting display of the information handling system. Again, resolutions of the various presenting display devices may include, for example, a 1080i/1080p resolution, a 720p resolution, a 576i/576p resolution, a DV/480i.480p resolution, among others. Indeed, the different resolutions of each of these presenting display devices may include any aspect ratio and may include high-definition aspect ratios, video graphics array aspect ratios, extended graphics array aspect ratios, and quad extended graphics array aspect ratios, among others. Because these resolutions may vary among the display devices of the participating information handling systems, certain visual artefacts may be seen (e.g., small screen sizes, blockiness) by any user engaged in the video conference session. It is also appreciated that any participating information handling system of the video conference session may include a plurality of display devices that may have different resolutions and frame rates. As described herein, the active application window monitoring system may determine which, among the plurality of display devices the participant is using to view the AV data during the video conference session. Again, the specific display device used by the participant may change during the video conference session and the active application window monitoring system may detect such changes and automatically determine and apply a new autoscaling factor according to the methods described herein.

The method 600 may further include, at block 620, executing the screen resolution normalization system to receive an autoscaling factor descriptive of how to upscale and downscale video frames of the AV data sent to the information handling system, the autoscaling factor based on the data descriptive of the resolution of the presenting displays of each endpoint device. As described herein, each of the information handling systems may include a screen resolution normalization system that gathers and reports the resolution of a presenting display of the information handling system to, for example, a backend server (e.g., host server) or the host information handling system that also includes a screen resolution normalization system. The relaying of this data may allow each participating endpoint device to know the resolution of the presenting displays of each other endpoint device. In the embodiment where a host server is used, this data is maintained and aggregated at the host server.

Again, the autoscaling factor may be applied to those video frames received from a GUI of the executed application being shared by the presenter during the video conference session. Thus, in this embodiment, the video frames of entire display of the presenter received by the participant is not autoscaled but instead only those portions representative of the screenshare content (e.g., executed application GUIs) sent to the recipient by the presenter is autoscaled. For example, where a presenter is presenting a PowerPoint® presentation, the information handling system performance optimizer application may cause the AV data associated with only the video frames of the GUIs created by the execution of the PowerPoint® presentation at the presenter's information handling system and received at the participant's information handling system to be subjected to the autoscaling factor. This may allow a presenter to select specific application GUIs to be presented to the other participants of the video conference session thereby potentially reducing the amount of AV data transmitted.

The method, at block 625, further includes executing the screen resolution normalization system to autoscale each video frame received at the information handling system using the autoscaling. The autoscaling factor received by this information handling system may be determined or formed based on any disparities in resolutions between any given endpoint devices such as the information handling system descried herein. These disparities, as described herein, may be determined based on a selection of a video/graphic display device or software application to share screen content by the presenter. Again, where multiple video/graphic display devices are used at the presenter's information handling system, an active application window monitoring system may be executed to determine which display is the presenting video/graphic display device. Based on the selection, the resolution of the presenting video/graphic display device may be determined. With data descriptive of the resolution of the presenter's video/graphic display device and the resolution of the video/graphic display devices associated with each participant, the autoscaling factor to be used may be determine. At this point the screen resolution normalization system may autoscale each video frame received from a presenting information handling system at the participants' information handling system using the autoscaling at block 625.

In an embodiment, the information handling system performance optimizer application may determine the autoscaling factor by dividing the resolution of the presenting display of a first information handling system (e.g., a first information handling system described here) by the resolution of the presenting display of any given participant (e.g., any given endpoint device) this information handling system receives video frames from. In these embodiments, the autoscaling factors relayed across the network of endpoint devices by the information handling system performance optimizer application may be different for each endpoint device. For example, the information handling system performance optimizer application may receive resolution data from a first information handling system that indicates the presenting display device has a resolution of 1080p. Additionally, the information handling system performance optimizer application may receive resolution data from a second information handling system (e.g., a presenting information handling system) that indicates the presenting display device has a resolution of 720p. In this embodiment, the autoscaling factor for the first information handling system used to autoscale video frames sent to the second information handling system may be 1080/720=1.5. This means that the first information handling system autoscales video frames by downscaling each video image by a factor of 1.5. Similarly, the autoscaling factor for the second information handling system used to autoscale video frames sent to the first information handling system may be 0.667 (e.g., 720/1080). These similar autoscaling factors may be used instead on any video frames received at either the first information handling system (e.g., upscale video frames by a factor of 0.667) or second information handling system (e.g., downscale video frames by a factor of 1.5). Alternatively, or additionally, further autoscaling factors may be used as the first information handling system sends video frames and the second information handling system receives those video frames and visa-versa.

The method 600 may also include, at block 630, executing a frame rate normalization system to, via the OOB communication with each participating endpoint device, request data descriptive of a frame rate of an presenting display at each participating endpoint device and receive data descriptive of a frame rate of the presenting displays at each participating endpoint device to adjust for disparate frames rates among the participating endpoint devices and the host information handling system. Similar to the execution of the screen resolution normalization system, the execution of the frame rate normalization system may cause the information handling system performance optimizer application to request frame rate data from each of the participating information handling systems during the video conference session and cause data to be sent to each of the participating information handling systems in order to adjust for disparate frames rates among the participating endpoint devices. The execution of this process may eliminate any choppiness in video streaming that is discernable by any user of the participating information handling systems. In an embodiment, the adjustment of a frame rate may cause each display to operate at a lowest frame rate among the participating information handling systems. The above adjustments may continue and be monitored for changes such as changed selections of screenshare content or changed presenter information handling systems until the video conference session has ended. At this point the method 600 may end.

The blocks of the flow diagrams of FIGS. 5 and 6, or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A host server information handling system executing a multimedia multi-user collaboration application (MMCA), comprising:
   a processor;
   a memory;
   a power management unit;
   a network interface device to receive and transmit audio/visual (AV) data during execution of the MMCA for a video conference session;
   the processor configured to execute a screen resolution normalization system to:
      initiate an out-of-band (OOB) communication with each participating endpoint device and requests data descriptive of a resolution of a presenting display at each participating endpoint device;
      receive the data descriptive of the resolution of the presenting displays at each participating endpoint device;
      determine screenshare content displayed on a display screen of a presenter to be shared with participants;
      determine an autoscaling factor descriptive of how to upscale and downscale video frames of the AV data of the screenshare content to be received at each of the participating endpoint devices from a presenter device based on the data descriptive of the resolution of the presenting displays; and
      transmit the autoscaling factor based on the resolution of the presenting displays at each participating endpoint device relative to the display at a presenter device to each participating endpoint device.

2. The information handling system of claim 1, further comprising the screen resolution normalization system to:
   determine an autoscaling factor to each of the participating endpoint devices descriptive of how to upscale and downscale video frames of the AV data sent from each of the participating endpoint devices based on the data descriptive of the resolution of the presenting displays relative to the presenter display displaying screenshare content; and
   transmit the autoscaling factor via the OOB communication to each participating endpoint device.

3. The information handling system of claim 1 further comprising:
   an autoscaling factor being calculated by dividing the resolution of the presenting display of a presenter by the resolution of the presenting display of the participant for post-processing of the video frames received at the endpoint device of the participant.

4. The information handling system of claim 1 wherein the transmitted autoscaling factor resizes the screenshared content at each participating endpoint device.

5. The information handling system of claim 1 further comprising:
   a frame rate normalization system to, via the OOB communication with each participating endpoint device, request data descriptive of a frame rate of a presenting display at each participating endpoint device.

6. The information handling system of claim 1 further comprising:
   the processor executing an active application window monitoring system to detect whether the information handlings system is docked to a plurality of video/graphic display devices at the presenter device.

7. The information handling system of claim 1 further comprising:
   the processor executing an active application window monitoring system to detect which among a plurality of display devices displaying screenshare content selected to be shared by a presenter of the video conferencing session and to request data descriptive of a resolution of that detected display device.

8. A method of normalizing shared video frames during a video conference session executed by a multimedia multi-user collaboration application (MMCA), comprising:
   with the execution of a network interface device by a processor of a presenter information handling system, receiving and transmitting audio/visual (AV) data during execution of the MMCA for a video conference session with the processor;
   executing, with the processor of the presenter information handling system, a screen resolution normalization system to:
   initiate an out-of-band (OOB) communication with a backend server and send data descriptive of a resolution of a presenting display at the presenter information handling system that presents screenshare content to be shared with participants of the video conference session to determine an autoscaling factor descriptive of how to upscale and downscale video frames of the AV data of the screenshare content to be sent by the presenter information handling system based on data descriptive of a resolution of participant presenting displays of each endpoint device associated with the participants in the video conference session and
   transmit AV data with screenshare content data, via a network interface device, to each endpoint device.

9. The method of claim 8 further comprising:
   determining an autoscaling factor to be sent to each of the participating endpoint devices descriptive of how to upscale and downscale video frames of the AV data sent from the presenter information handling system based on data descriptive of the resolution of the presenting display of the presenter information handling system;
   transmitting the autoscaling factor to each participating endpoint device.

10. The method of claim 8 further comprising:
    calculating an autoscaling factor for use at an endpoint device participating in the video conference session by dividing the resolution of the presenting display of the presenter information handling system by the resolution of the presenting display of an endpoint device for post-processing of the video frames of the AV data received at the endpoint device of the participant.

11. The method of claim 8 further comprising:
    executing, with the processor of the presenter information handling system, a frame rate normalization system to, via the OOB communication with the backend server, send data descriptive of a frame rate of a presenting display of the presenter information handling system.

12. The method of claim 8 further comprising:
executing, with the processor of the presenter information handling system, a software application for generating the screenshare content to be displayed on the presenting display; and
receiving a selection input to share the screenshare content via the MMCA.

13. The method of claim 8 further comprising:
with the processor, executing an active application window monitoring system to detect which among a plurality of display devices the presenter information handling system is displaying selected screenshare content data to be shared and sending data descriptive of a resolution of that display device used.

14. The method of claim 8, further comprising:
transmitting the autoscaling factor to each endpoint device descriptive of how to resize the screenshared content at each participating endpoint device.

15. A participant information handling system executing a multimedia multi-user collaboration application (MMCA) and engaging in a video conference session, comprising:
a processor;
a memory;
a power management unit;
a network interface device to receive and transmit audio/visual (AV) data during execution of the MMCA for a video conference session;
the processor configured to execute a screen resolution normalization system to:
initiate an out-of-band (OOB) communication with a central optimizer server of the video conference session and sends data descriptive of a resolution of a presenting display of the information handling system; and
receive an autoscaling factor descriptive of how to upscale and downscale video frames of the AV data of the screenshare content shared from a presenter information handling system to be sent to the information handling system, the autoscaling factor based on the data descriptive of the resolution of the presenting displays of the presenter information handling system relative to a video display of the participant information handling system;
autoscale each video frame received at the information handling system using the autoscaling factor; and
the processor to normalize and display, via the participant presenting display, the screenshared content received from the presenter information handling system.

16. The information handling system of claim 15 further comprising:
the processor to determine an autoscaling factor descriptive of how to upscale and downscale video frames of the AV data received at the participant information handling system based on the data descriptive of the resolution of the participant presenting display used to display screenshared content selected from among a plurality of displays at the participant information handling system.

17. The information handling system of claim 15, further comprising:
the autoscaling factor being calculated by dividing the resolution of the presenting display of a presenter by the resolution of the participant presenting display of the participant information handling system for post-processing of the video frames received at the of the participant information handling system.

18. The information handling system of claim 15 further comprising:
the processor executing a frame rate normalization system to, via the OOB communication with the participant information handling system, transmit data descriptive of a frame rate of the participant presenting display at the participant information handling system.

19. The information handling system of claim 15 further comprising a frame rate normalization system to, via the OOB communication with each participant information handling system, transmit data descriptive of a frame rate of the participant presenting display to every other participating endpoint device to adjust for disparate frames rates among the participating endpoint devices.

20. The information handling system of claim 15, further comprising:
the processor executing the screen resolution normalization system to detect when the participant display device presenting the screenshared content is undocked or docked and to send an indication, via the OOB communication, describing the resolution of available displays of the docked or undocked participant information handling system.

* * * * *